US012251804B2

(12) United States Patent
Carrier

(10) Patent No.: US 12,251,804 B2
(45) Date of Patent: Mar. 18, 2025

(54) MAGAZINE FASTENER GUIDE FOR A FASTENER DRIVING TOOL

(71) Applicant: Kyocera Senco Industrial Tools, Inc., Cincinnati, OH (US)

(72) Inventor: Alexander L. Carrier, Columbus, OH (US)

(73) Assignee: Kyocera Senco Industrial Tools, Inc., Cincinnati, OH (US)

( * ) Notice: Subject to any disclaimer, the term of this patent is extended or adjusted under 35 U.S.C. 154(b) by 175 days.

(21) Appl. No.: 18/107,161

(22) Filed: Feb. 8, 2023

(65) Prior Publication Data

US 2023/0264331 A1 Aug. 24, 2023

Related U.S. Application Data

(60) Provisional application No. 63/312,129, filed on Feb. 21, 2022.

(51) Int. Cl.
*B25C 1/00* (2006.01)
*B25C 1/04* (2006.01)

(52) U.S. Cl.
CPC .............. *B25C 1/003* (2013.01); *B25C 1/047* (2013.01)

(58) Field of Classification Search
CPC ......... B25C 1/003; B25C 1/047; B25C 1/005; B25C 1/008; B25C 5/1658; B25C 1/184; B25C 5/1665; B25C 7/00; B25C 1/001; B25C 5/16; B25C 1/00; B25C 1/04; B25C 1/18; B25C 5/1651; B25C 5/1668
See application file for complete search history.

(56) References Cited

U.S. PATENT DOCUMENTS

| | | | | |
|---|---|---|---|---|
| 3,720,364 | A | 3/1973 | Maestri | |
| 6,880,739 | B1 | 4/2005 | Zhu | |
| 6,896,165 | B1 | 5/2005 | Wang | |
| 7,959,049 | B2 | 6/2011 | Dittrich | |
| 7,980,441 | B2 | 7/2011 | Dittrich | |
| 2012/0187177 | A1* | 7/2012 | Myburgh ................ | B25C 1/005 227/120 |
| 2014/0138422 | A1 | 3/2014 | Fasco | |
| 2018/0001451 | A1 | 1/2018 | Meyer | |
| 2019/0255689 | A1 | 8/2019 | Leimbach et al. | |
| 2020/0070330 | A1* | 3/2020 | Carrier .................. | H02K 11/30 |

OTHER PUBLICATIONS

ISA International Search Report, mailed Jun. 30, 2023, 13 pages.

* cited by examiner

*Primary Examiner* — Veronica Martin
(74) *Attorney, Agent, or Firm* — Frederick H. Gribbell; Russell F. Gribbell; William E. Crouse

(57) ABSTRACT

A fastener magazine for a fastener driving tool has a movable guide that allows fasteners of various lengths to be loaded in the magazine. When engaged, the movable guide sequentially directs each fastener's movement during a drive stroke. When disengaged, the movable guide does not interfere with each fastener's movement during a drive stroke. In the engaged position, the movable guide prevents a fastener from complete "backtracking" back into the magazine during a drive stoke, which otherwise could potentially cause a jam condition.

24 Claims, 27 Drawing Sheets

MAGAZINE FASTENER GUIDE FOR A FASTENER DRIVING TOOL

CROSS-REFERENCE TO RELATED APPLICATIONS

The present application claims priority to provisional patent application Ser. No. 63/312,129, titled “MAGAZINE FASTENER GUIDE FOR A FASTENER DRIVING TOOL,” filed on Feb. 21, 2022.

TECHNICAL FIELD

The technology disclosed herein relates generally to linear fastener driving tools and is particularly directed to fastener magazines of the type which sequentially feed a fastener into a driver track in a guide body of a linear fastener driving tool. At least one embodiment is disclosed as a fastener magazine that is used in a linear fastener driving tool, in which a movable guide has been mounted on the magazine. The movable guide can be set to an engaged position, in which the movable guide sequentially directs fasteners from the magazine into a guide body of the tool, such that the fasteners cannot “backtrack” during a drive stroke, thus preventing a possible jam condition. The movable guide can also be set to a disengaged position, in which the movable guide does not sequentially direct fasteners from the magazine into the guide body of the tool.

The movable guide is designed to allow a user to load the fastener magazine with fasteners of various lengths, while simultaneously preventing potential jam conditions by preventing a fastener from completely “backtracking” into the magazine during a drive stroke of the tool. This movable guide is also sometimes referred to as a magazine “block out,” because it can block certain fasteners from being fed into the tool’s guide body, if in its engaged position. By providing the movable guide near the exit portion of the magazine, a shorter fastener may be used in the magazine without allowing backtracking to occur, since the guide includes a ramp portion that causes the fastener to be ‘re-aimed’ into the fastener/driver track of the tool, and thereby preventing any “complete backtracking” movements of the fastener.

A second embodiment is disclosed as a fastener magazine that is used in a linear fastener driving tool, in which the fastener magazine is removably attached to the tool. The tool has a receptacle proximal to the front end, and the fastener magazine has a fulcrum portion that corresponds to the receptacle. To attach the fastener magazine, a user holds the fastener magazine at an angle to the front of the tool, places the fulcrum in the receptacle, and then “pivots” the fastener magazine towards the tool, and then finally latching it securely to the tool. This “pivot” method of fastener magazine attachment allows a user to quickly clear a jammed fastener, without a lengthy disruption of work on the jobsite.

STATEMENT REGARDING FEDERALLY SPONSORED RESEARCH OR DEVELOPMENT

None.

BACKGROUND

Many conventional fastener driving tools use a fastener magazine to carry a plurality of fasteners to be fired in a sequential manner Many fastener magazines are designed to load only one length of fasteners. It becomes time consuming for a user to swap magazines out to simply change fastener lengths while operating the tool.

Some magazines can load fasteners of a variety of lengths. However, using a fastener length that is too short for the magazine may cause the fastener to “backtrack” into the magazine during a drive stroke, potentially causing a jam condition. If a fastener actually completely “backtracks” back into the magazine during a drive stroke, it can be time consuming to unjam or repair the tool.

Typical magazines available in the past are designed to handle only one size (length) of fastener, such as a nail. So, if a shorter nail is placed into the magazine, that shorter nail will be much more likely to not ‘feed’ properly into the driver track of the nailer tool, and may indeed “backtrack” into the magazine while it is being driven.

Magazines are also typically secured to the tool, and typically hold a single specific length of fastener. If a user needs to change fastener lengths, the magazine either has to be painstakingly disassembled from the tool, and a different magazine attached that will accommodate the new fastener length; or, the user will need to change tools entirely because the magazine is unremovable from the tool and only accommodates a specific fastener length.

SUMMARY

Accordingly, it is an advantage of the present technology disclosed herein to provide a fastener magazine that has a movable guide to sequentially direct fasteners during a drive stroke of a fastener driving tool.

It is another advantage to provide a fastener magazine that has a sufficiently large fastener-receiving dimension which allows a variety of fastener lengths to be loaded into the magazine, and has a movable guide that prevents “complete backtracking,” while also preventing a potential jam condition during a drive stroke.

It is yet another advantage to provide a fastener driving tool including a magazine that has a sufficiently large fastener-receiving dimension which allows a variety of fastener lengths to be loaded in the magazine, and has a movable guide subassembly with a movable gate which exhibits a ramp portion that guides shorter fasteners into the driver/fastener track of the tool’s guide body, and thereby prevents “complete backtracking” toward the magazine.

It is still another advantage to provide a fastener driving tool including a magazine that has a sufficiently large fastener-receiving dimension which allows a variety of fastener lengths to be loaded in the magazine, and has a movable guide subassembly with a movable gate which exhibits a ramp portion that guides shorter fasteners into the driver/fastener track of the tool’s guide body, in which the movable gate can be positioned in an “engaged” position so that its ramp portion will guide the shorter fasteners, or the movable gate can be positioned in a “disengaged” position, in which the gate is moved into a pocket near the first end of the magazine, and thus is in a non-interfering location that will not contact the longer fasteners that can be used with this magazine/tool.

It is a further advantage to provide a fastener driving tool including a removable magazine, in which the tool has a (first) magazine attachment point, the magazine has a corresponding attachment portion, and the magazine is attached to the tool at the first attachment point while angled outward from the tool, then pivoted towards the tool via the first attachment point, and then securely latched to the tool at a second attachment point, along the elongated side of the magazine.

It is a yet further advantage to provide a fastener driving tool including a removable magazine, in which the tool has a magazine receiving area that includes a rounded opening for receiving a cylindrically-shaped fulcrum that is part of the magazine, in which the magazine's fulcrum is at an extended position from the 'feeding end' of the magazine (where the fasteners in the magazine exit from the magazine and into the tool's guide body), and in which the tool's rounded opening at the receiving area has a geometric center, and finally, in which the magazine's fulcrum pivots about that geometric center after the fulcrum is initially placed into that rounded opening, and then the magazine is latched into place by a separate latching mechanism, which (when combined with the fulcrum in the rounded opening) than securely holds the magazine in place against the tool, for use in driving fasteners that are fed sequentially from the magazine.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a fastener magazine for a fastener driving tool is provided, which comprises: (a) a magazine housing including a first end and a second end, and a longitudinal axis that extends between the first and second ends, the magazine housing configured to hold a plurality of fasteners that are placed between the first and second ends and are movable therebetween; (b) a mounting bracket on the magazine housing proximal to the first end; (c) a fastener pusher that biases the plurality of fasteners toward the first end; (d) a movable fastener guide secured to the mounting bracket; (e) the movable fastener guide having an engaged position and a disengaged position; wherein: (f) if in the engaged position, the movable fastener guide sequentially directs one of the plurality of fasteners toward the first end of the magazine in a manner such that the fastener is prevented from completely backtracking, by mechanically interfering with a movement of the one of the plurality of fasteners that becomes misaligned; and (g) if in the disengaged position, the movable fastener guide does not mechanically interfere with a movement of the one of the plurality of fasteners.

In accordance with another aspect, a fastener driving tool is provided, which comprises: (a) a working cylinder that includes a movable piston, the cylinder including a variable displacement volume on a first side of the piston, and the cylinder including a variable venting volume on a second, opposite side of the piston; (b) a storage chamber; (c) an end cap that is attached to at least one of the cylinder and the storage chamber near an end portion of the fastener driving tool; (d) a movable driver that is in mechanical communication with the piston; (e) a guide body that guides movements of the driver; (f) a magazine housing including a first end and a second end, the magazine housing configured to hold a plurality of fasteners; (g) a mounting bracket on the magazine housing proximal to the first end; (h) a movable fastener guide secured to the mounting bracket; (i) the movable fastener guide including an engaged position and a disengaged position; wherein: (j) in the engaged position, the movable fastener guide sequentially directs one of the plurality of fasteners in a manner such that the fastener is prevented from completely backtracking; and (k) in the disengaged position, the movable fastener guide does not sequentially direct the plurality of fasteners.

In accordance with yet another aspect, a movable guide for use in a fastener magazine for use with a fastener driving tool is provided, the movable guide comprising: (a) a rotatable knob that is sized and shaped for actuation by a human hand, the knob being mounted on a surface of a fastener magazine, proximal to an exit end of the fastener magazine; (b) a rotatable gate that is also located proximal to the exit end of the fastener magazine; (c) a stem that resides between the knob and the gate, and has sufficient structural rigidity so that the gate is forced to move rotationally if the knob is moved rotationally; (d) a spring that creates a biasing force against the knob and against the surface of the fastener magazine; and (e) a knob holding pin that secures the knob at the surface of the fastener magazine; wherein: (f) the knob and gate are movable between a disengaged position and an engaged position, such that: (i) if the knob and the gate are in the disengaged position, then the gate resides in a non-interfering location, and a fastener moving through the magazine will not make physical contact with the guide; and (ii) if the knob and the gate are in the engaged position, then the knob holding protrusion keeps the knob in that engaged position until released by an action of a human hand, and the gate resides in an interfering location, in which a misaligned fastener will make physical contact with a ramp portion of the guide, as the fastener is being driven by a moving driver of a fastener driving tool that is adjacent to the exit end of the fastener magazine.

In accordance with still another aspect, a method for attaching a removable fastener magazine to a fastener driving tool is provided, in which the method comprises the following steps: (a) providing a fastener driving tool that includes at least a housing, a handle portion, a front end subassembly proximal to an exit end of the tool; the front end subassembly comprising a rounded receptacle subassembly, and a guide body having a bottom portion and a backplate, the rounded receptacle subassembly including at least: (i) an opening in the backplate of the guide body, the opening exhibiting a geometric center; (ii) a ramp surface; and (iii) a first corner between the opening and the ramp surface; (b) providing a removably attachable fastener magazine having a magazine housing including a first end and a second, opposite end, and a longitudinal axis that extends between the first and second ends, the magazine housing configured to hold a plurality of fasteners that are placed between the first and second ends and are movable therebetween, the fastener magazine exhibiting a fulcrum portion that includes: (i) a cylindrical outer surface; (ii) a side protrusion proximal to the cylindrical outer surface of the fulcrum; and (iii) an extension portion that extends between the cylindrical outer surface and the first end of the magazine, the extension portion having an upper surface portion and a lower surface portion; and (c) attaching the fastener magazine to the fastener driving tool by: (i) inserting the side protrusion into the opening of the backplate; (ii) rotating the fulcrum portion around the geometric center of the opening in the backplate; (iii) pressing the upper surface portion of the magazine against the bottom portion of the guide body; and (iv) engaging a mounting bracket on the tool with a latch subassembly on the magazine.

In accordance with a further aspect, a fastener driving tool having a removable fastener magazine is provided, the tool comprising: (a) a housing, a handle portion, and a nose portion that includes a guide body having a fastener track and a first mounting bracket receiving portion, the nose portion exhibiting a rounded receptacle subassembly that includes: (i) a bottom portion; (ii) a rounded opening in the bottom portion; (iii) a ramp surface proximal to the rounded opening; and (iv) a geometric center proximal to the rounded opening; and (b) a removable fastener magazine having a first end, a second end, and a longitudinal axis that extends between the first and second ends, the removable fastener magazine configured to hold a plurality of fasteners placed between the first and second ends and are movable therebetween, the removable fastener magazine including a first mounting bracket with a fulcrum portion that exhibits: (i) a fulcrum having a cylindrical outer surface; and (ii) an extension portion having an upper surface portion and a lower surface portion, the extension portion extending to the fulcrum; wherein, the removable fastener magazine pivotally attaches to the tool at the geometric center of the rounded opening of the nose portion rounded receptacle subassembly.

In accordance with a yet further aspect, a fastener magazine for a fastener driving tool is provided, which comprises: (a) a magazine housing including a first end and a second end, the magazine housing configured to hold a plurality of fasteners; (b) a means to secure a movable fastener guide on the magazine housing proximal to the first end; (c) the movable fastener guide including an engaged position and a disengaged position; wherein: (d) if the movable fastener guide is in the engaged position, then the movable fastener guide includes a means for sequentially directing one of the plurality of fasteners in a manner such that the fastener is prevented from completely backtracking; and (e) if the movable fastener guide is in the disengaged position, then the means for sequentially directing one of the plurality of fasteners does not physically contact a fastener.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
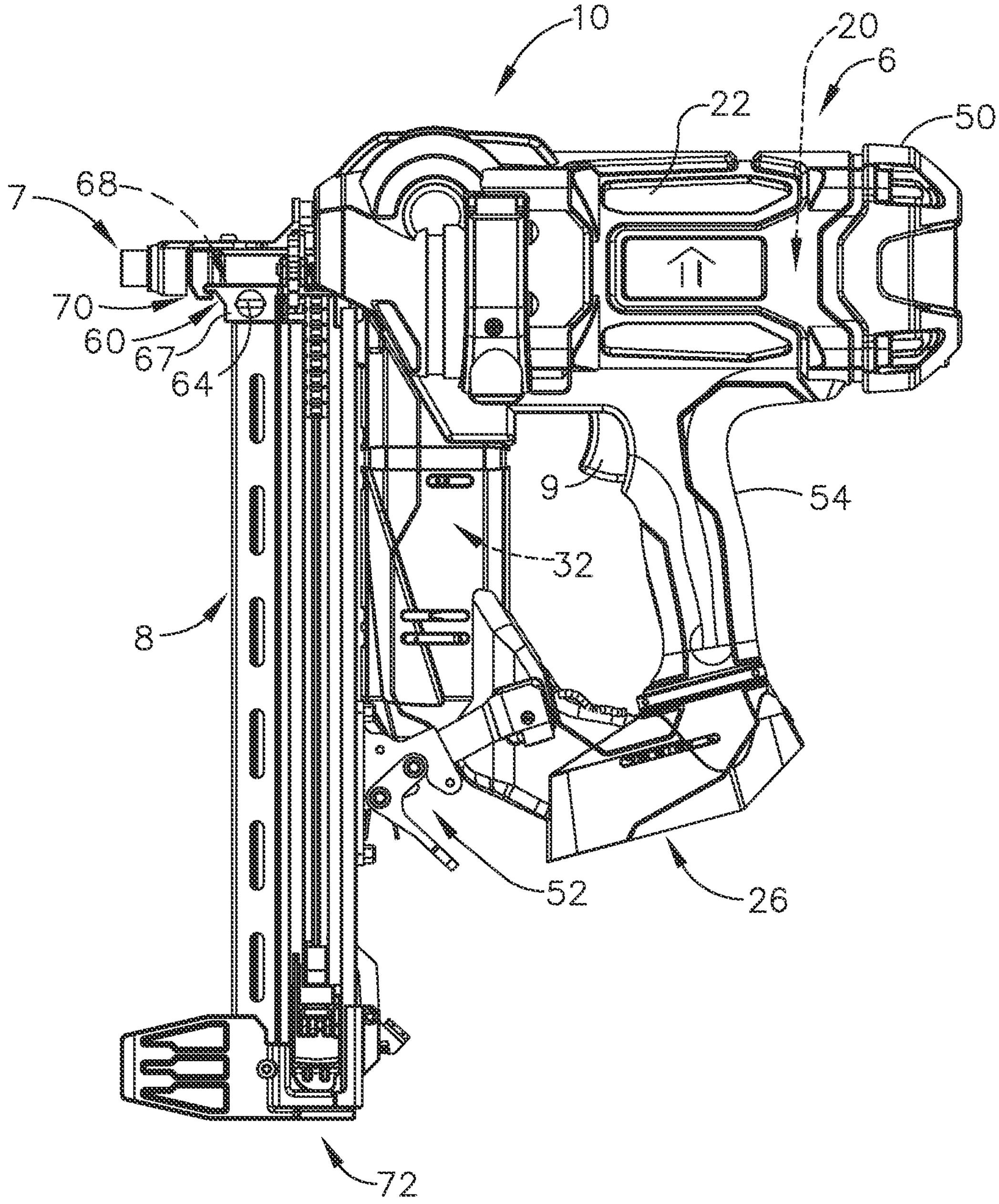
FIG. 1 is a left side elevational view of a fastener magazine attached to a fastener driving tool, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

Referring now to FIG. 1, a new embodiment of a fastener magazine, generally depicted by the reference numeral 8, is illustrated in a left side view. The fastener magazine 8 is shown attached to a fastener driving tool 10 in FIG. 1. The tool includes a pressurized chamber portion 6, a working cylinder with a driving piston 20, a nosepiece 92 with an exit end (for the fasteners) 7, and a hand-operated trigger 9. The tool has an outer housing 22, a motor housing 31, an end cap 50, a handle 54, and a battery pack connector 26.

The magazine 8 includes a latch subassembly 52 (to securely connect to the tool), a top portion 70 (also sometimes referred to herein as a "first end," or as the "exit end" of the magazine), a bottom portion 72 (also sometimes referred to herein as a "second end"), and a mounting bracket 67 proximal to the first end 70. The magazine 8 removably attaches to the tool 10 at the first end 70, and is secured to the tool using the latch subassembly 52, along its elongated side, about two-thirds of the way down that side, from the first end to the second end of the magazine.

A movable (or pivotable) fastener guide subassembly (S/A) 60 (also sometimes referred to herein as a "blockout S/A") is mounted on the mounting bracket 67 of the magazine. An adjustable knob 64 is illustrated, and the knob is used to move the guide S/A into either a first (or engaged) position or a second (or disengaged) position.

Figure 2:
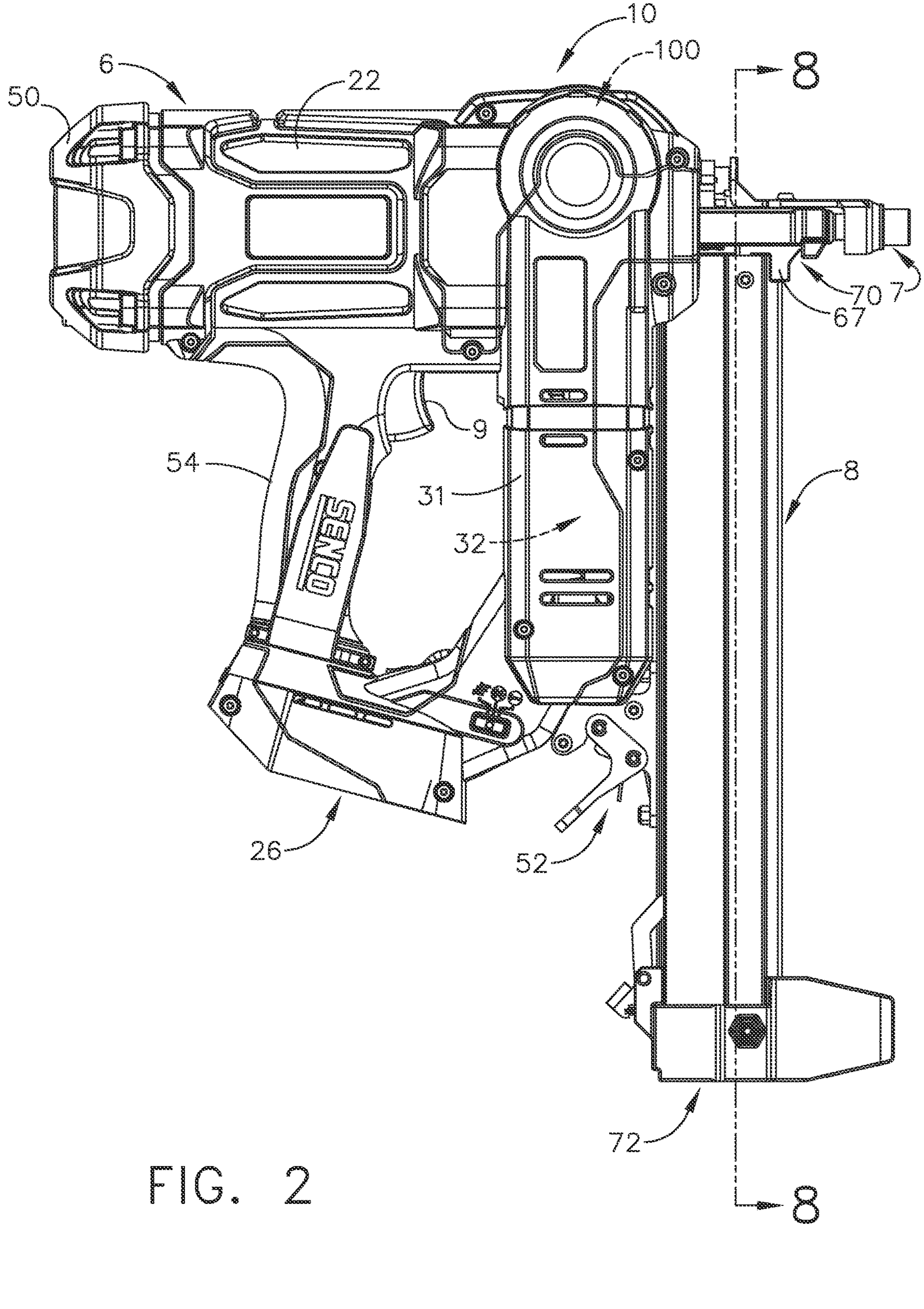
FIG. 2 is a right side elevational view of the magazine attached to the tool of FIG. 1.
Figure 3:
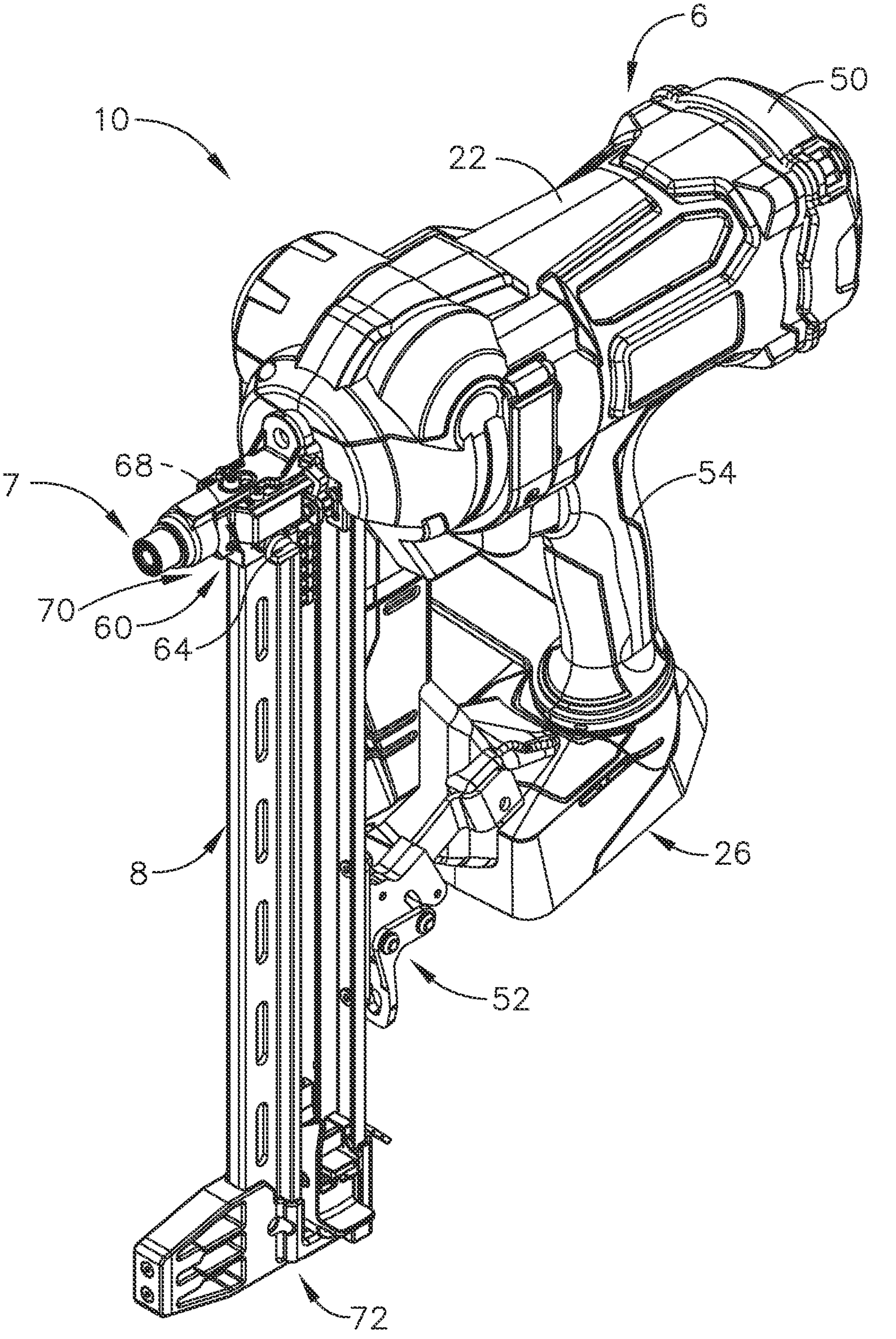
FIG. 3 is a left front perspective view of the magazine attached to the tool of FIG. 1.

FIG. 2 depicts the tool 10 and magazine 8 in a right side elevational view, and FIG. 3 depicts the tool 10 and the magazine 8 in a perspective view, essentially showing the same components as FIG. 1.

Figure 4:
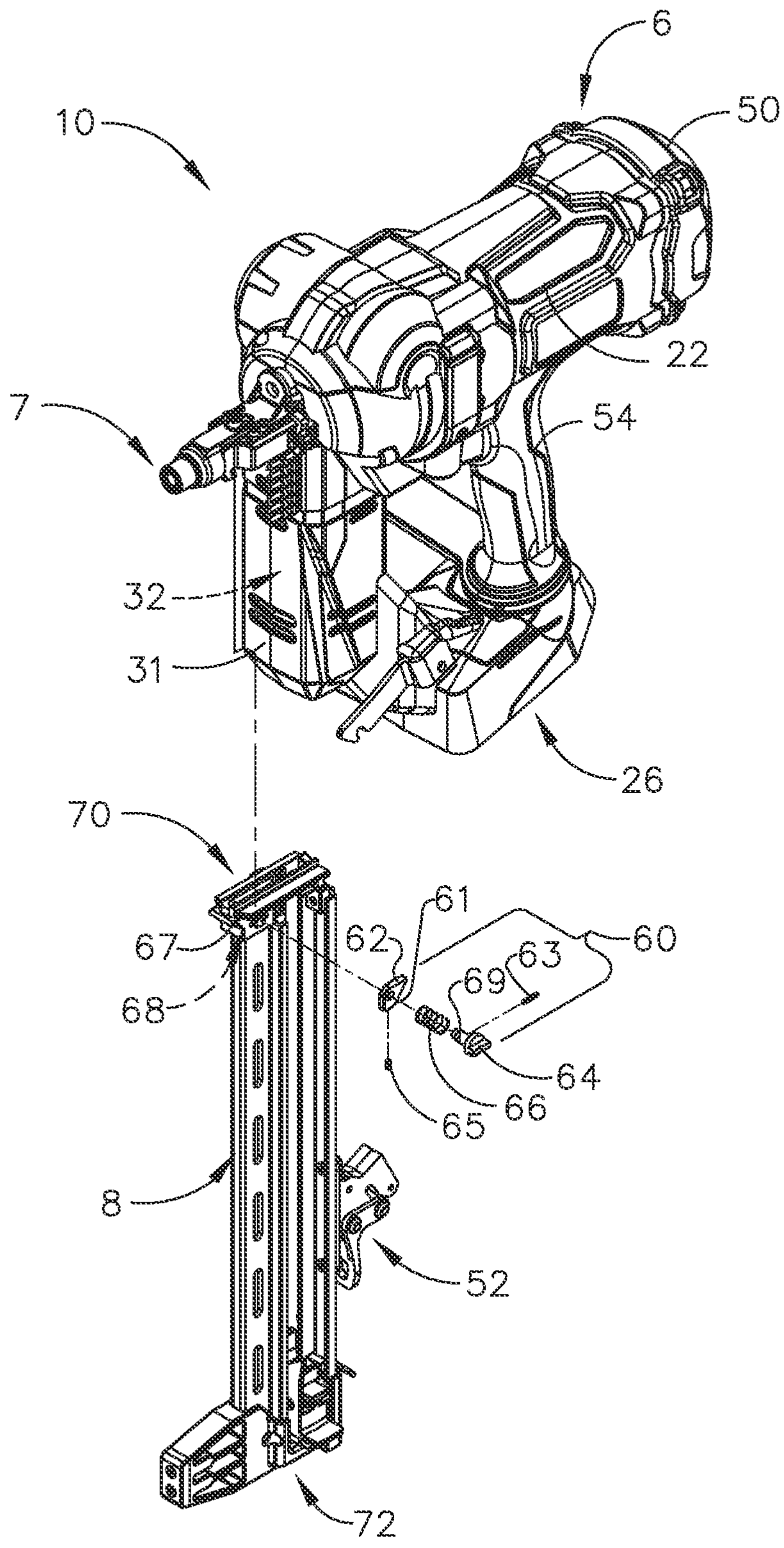
FIG. 4 is a left front perspective exploded view of the guide subassembly ("S/A") of the magazine of FIG. 1.

Referring now to FIG. 4, the guide S/A 60 is shown in an exploded view. The knob 64 is secured at the mounting bracket 67 by a knob holding pin 63. The mounting bracket 67 is proximal to the exit end of the fastener magazine 8, so that a manipulation of the knob 64 will have an effect to create a mechanical action proximal to that exit end (i.e., at the magazine's first end/top portion 70).

A spring 66 sits around a knob stem 69, and a gate 62 is mounted to the knob stem 69 by use of a gate holding pin 65. Thus, the gate 62 is positioned proximal to the exit end 70 of the fastener magazine 8. The spring 66 creates a biasing force that biases the knob 64 away from the bracket 67. The gate 62 has a ramp portion 61 which is used to direct a misaligned fastener during a drive stroke, as discussed below in greater detail. The knob stem 69 has sufficient structural rigidity so that the gate 62 is forced to move rotationally if the knob 64 is moved rotationally.

Figure 5:
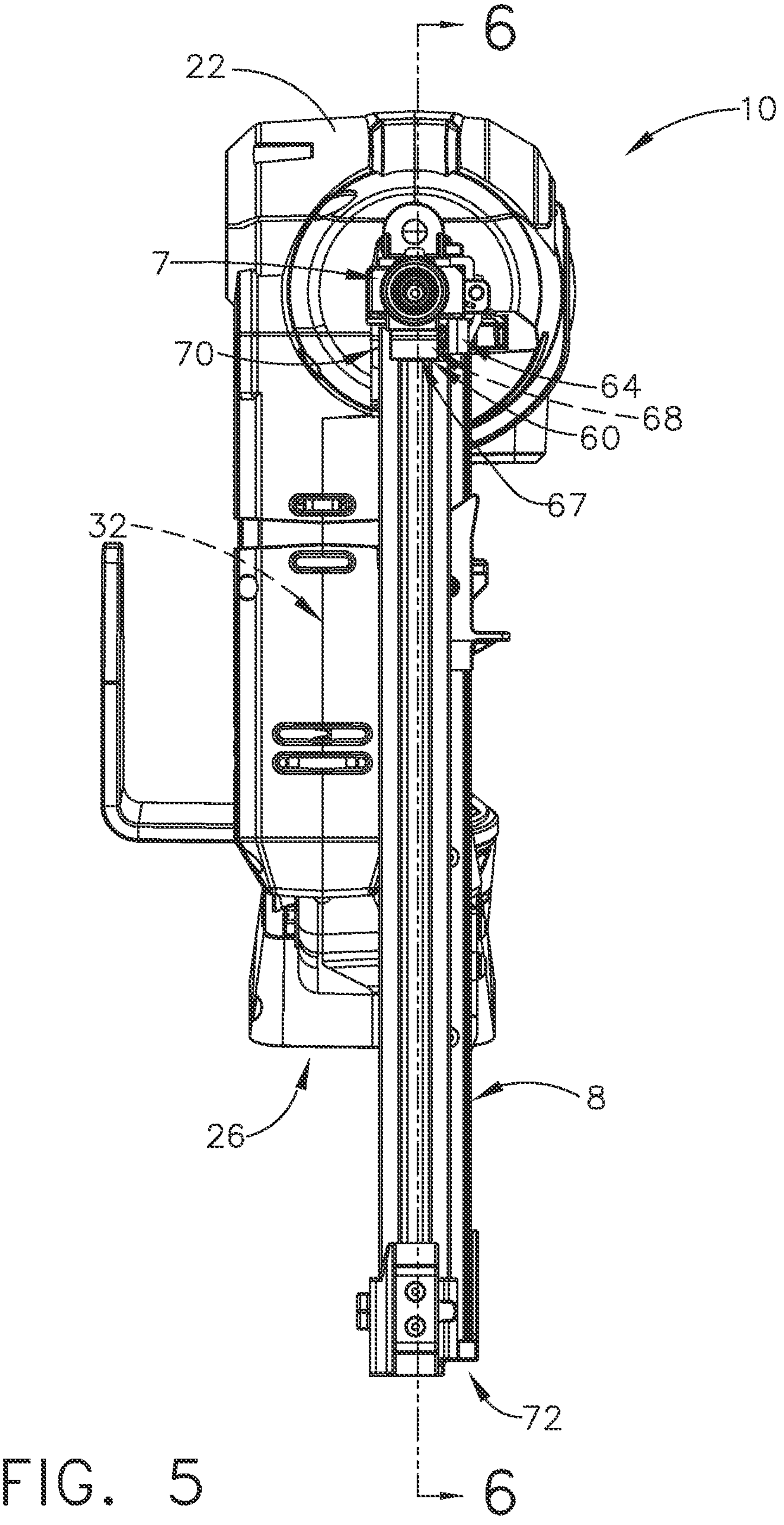
FIG. 5 is a front elevational view of the magazine attached to the tool of FIG. 1.

Referring now to FIG. 5, the tool 10 and the magazine 8 are shown in a front view. As can be seen in this view, the magazine 8 is attached at the centerline of the tool 10. However, the tool's centerline is not at the center of mass of the overall tool.

Figure 6:
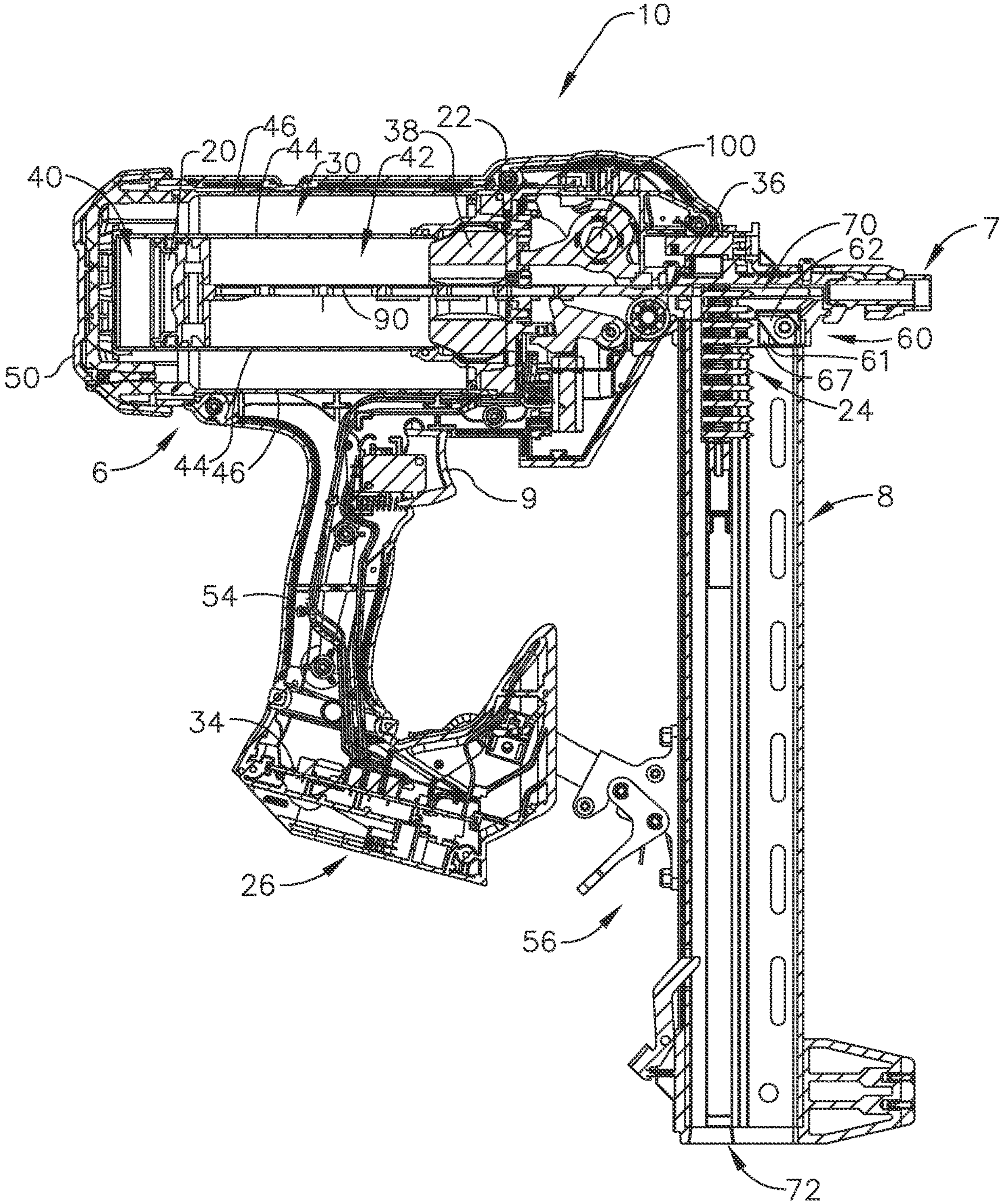
FIG. 6 is a right side cutaway view of the magazine attached to the tool of FIG. 5, along the section line 6-6, with the guide S/A disengaged.
Figure 7:
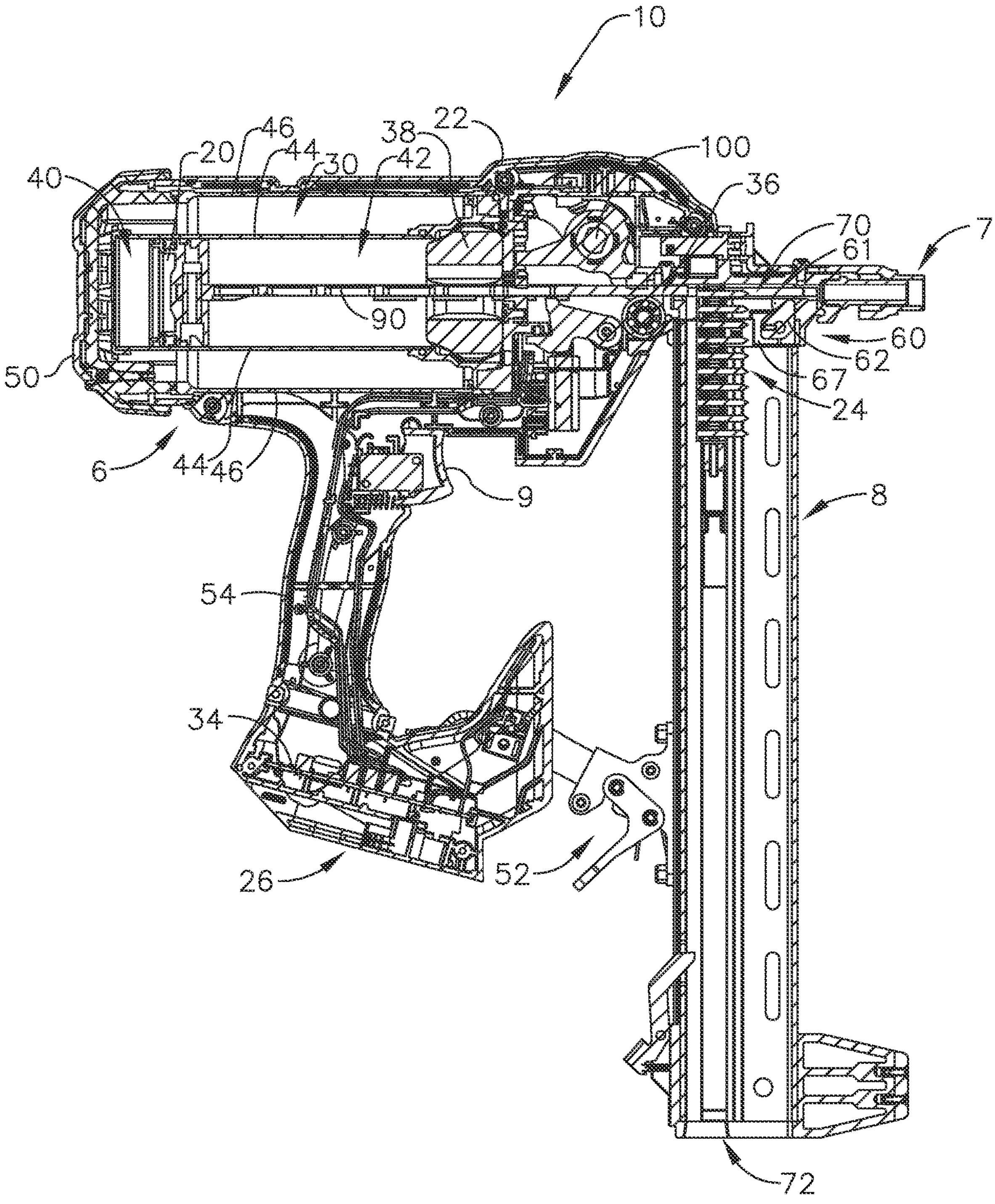
FIG. 7 is a right side cutaway view of the magazine attached to the tool of FIG. 5, along the section line 6-6, with the guide S/A engaged.

Referring now to FIGS. 6 and 7, the magazine 8 and the tool 10 are shown in a cutaway view along the section line 6-6 of FIG. 5. An outer sleeve or wall of a pressure chamber is illustrated at 46, and the top portion of the pressure chamber is covered by an end cap, designated by the reference numeral 50. A movable piston 20 is illustrated as being within a working cylinder, in which the outer cylindrical wall of the working cylinder is designated at 44.

The piston 20 is illustrated at a "ready" position, and it can reciprocatingly move left (in this view) towards the end cap 50, or it can move right (in this view) toward a piston stop 38. (The piston stop is also sometimes referred to as a bumper.) The variable volume "above" the piston in this view (at reference numeral 40) is referred to as the "displacement volume" which is pressurized, whereas the volume "below" the piston in this view (at reference numeral 42) is a variable volume referred to as "venting chamber" volume, which is open to atmosphere through the vents in the housing. As is understood in this area of technology, as the piston moves up and down in a reciprocating fashion, the displacement volume decreases and increases with each up and down stroke, and the venting chamber volume below the piston correspondingly also increases and decreases as the piston moves up and down (left and right in this view).

The piston 20 is typically attached to a driver 90 by a pin that is inserted through a small channel that also extends through an opening in the driver. The driver itself goes through an opening of the piston stop 38, and further into a guide body 36, which guides the driver in its movements for driving a fastener, along a driver track.

There is a main storage chamber that is pressurized with gas, generally designated by the reference numeral 30, which is also referred to herein as the "pressure chamber." In this embodiment, the pressure chamber 30 comprises an annular space that at least partially surrounds the working cylinder wall 44, and the pressurized space at 30 is essentially between the outer surface of the working cylinder wall 44 and the inner surface of the pressure chamber outer wall 46.

The main purpose of the pressure chamber 30 is to hold additional pressurized gas for use in driving the piston 20 in its rightward or "driving stroke" direction (in this view), in which it will be driving a fastener such as a nail or a staple. This additional pressurized gas in the pressure chamber provides a sufficient force to be imparted against the upper surface of the piston, while forcing a nail or staple into a target surface, such as a piece of wood. This storage volume 30 that comprises most of the pressure chamber allows a lower overall gas pressure to be used in the overall workings of this fastener driving tool to provide a gas spring effect without requiring an extremely high pressure that would otherwise be required in the displacement volume above the piston within the working cylinder, if there was no pressure chamber to hold additional pressurized gas.

After the fastener driving tool has been used to drive a fastener, the tool now must cause the driver 90 to be "lifted" back to its top-most position for a new firing (driving) stroke. This is accomplished by rotating a rotary-to-linear lifter 100 (also referred to herein as a "lifter"), which is actuated by a motor 32 (not shown on FIG. 6). Note that this motor is enclosed in a motor housing 31, which is part of the overall tool housing 22.

At least one printed circuit board that contains a controller is generally designated by the reference numeral 34, and is placed proximal to the battery connector 26 in this embodiment. The controller will typically include a microprocessor or a microcomputer device that acts as a processing circuit. At least one memory circuit will also typically be part of the controller, including Random Access Memory (RAM) and Read Only Memory (ROM) devices. To store user-inputted information (if applicable for a particular tool model), a non-volatile memory device would typically be included, such as EEPROM, NVRAM, or a Flash memory device.

The magazine 8 is configured to hold a fastener strip, generally designated by the reference numeral 24. The fastener strip 24 typically holds a plurality of fasteners, and these fastener strips can hold fasteners of a variety of lengths, such as between a half inch and one and one quarter inches long, for example. (Of course, each individual fastener strip only holds one specific length of fastener.) The magazine 8 is configured to hold these fastener strips, and fastener strips are loaded from the second end 72.

For longer fasteners 25, such as a one inch nail, for example, the gate 62 is moved to its disengaged position so that it does not block the movement of the nails. FIG. 6 depicts the gate 62 in a disengaged position. In the disengaged position, the spring 66 biases the gate 62 away from a magazine fastener track 74 and into a "pocket" 68 (see FIG. 8).

For shorter fasteners 24, such as a half inch nail, for example, the gate 62 is moved to its engaged position to help direct the movement of the nails as they are being driven into the nosepiece, and then into a workpiece. FIG. 7 depicts the gate 62 in an engaged position. In the engaged position, the knob 64 has been rotated and depressed, which moves the gate 62 towards the middle of the magazine fastener track 74 and out of the "pocket" 68 (thereby compressing the spring 66). The ramp portion 61 is pivoted toward the exit end 7 of the tool 10.

Figure 8:
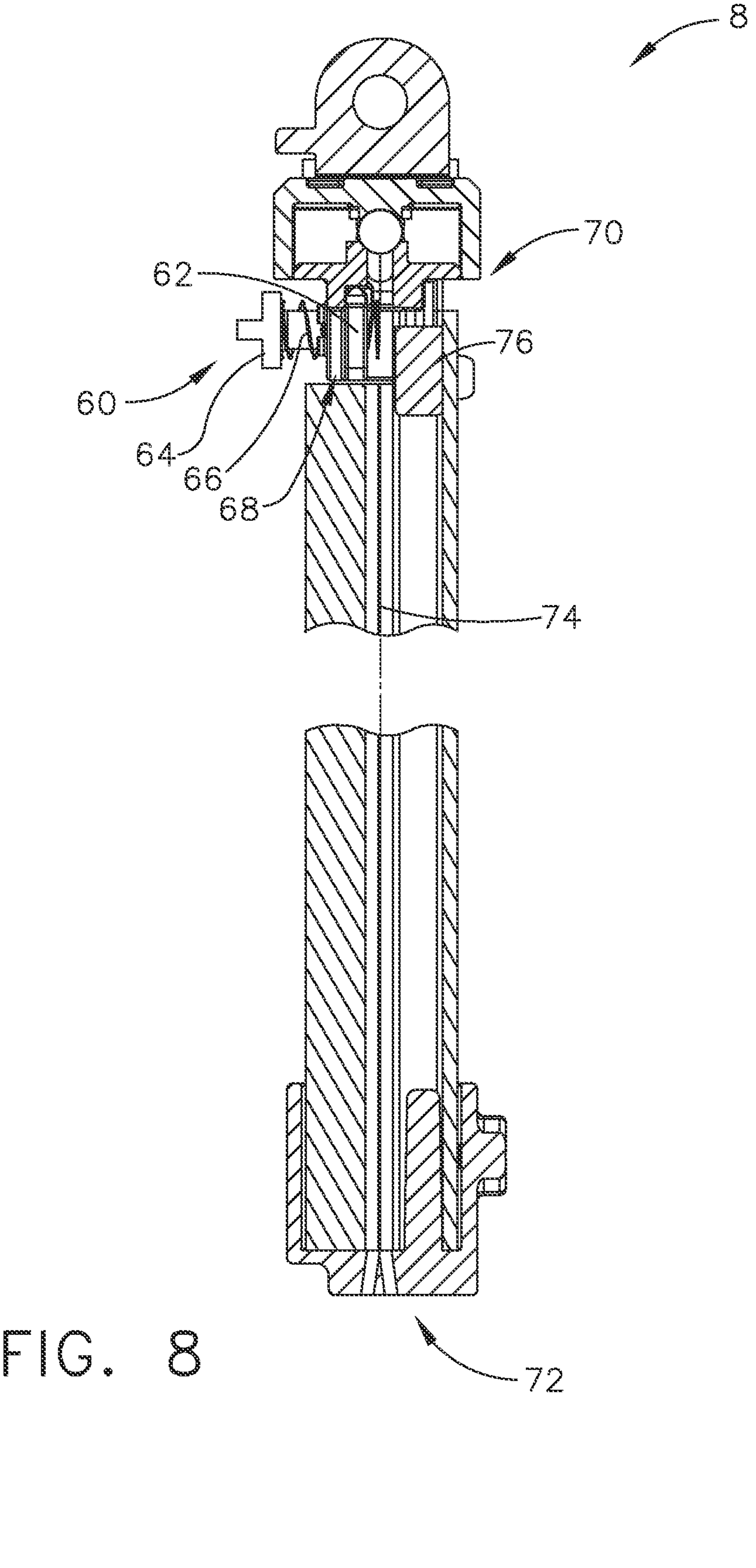
FIG. 8 is a cutaway view of the magazine of FIG. 2, along the section line 8-8, with the guide S/A disengaged.
Figure 9:
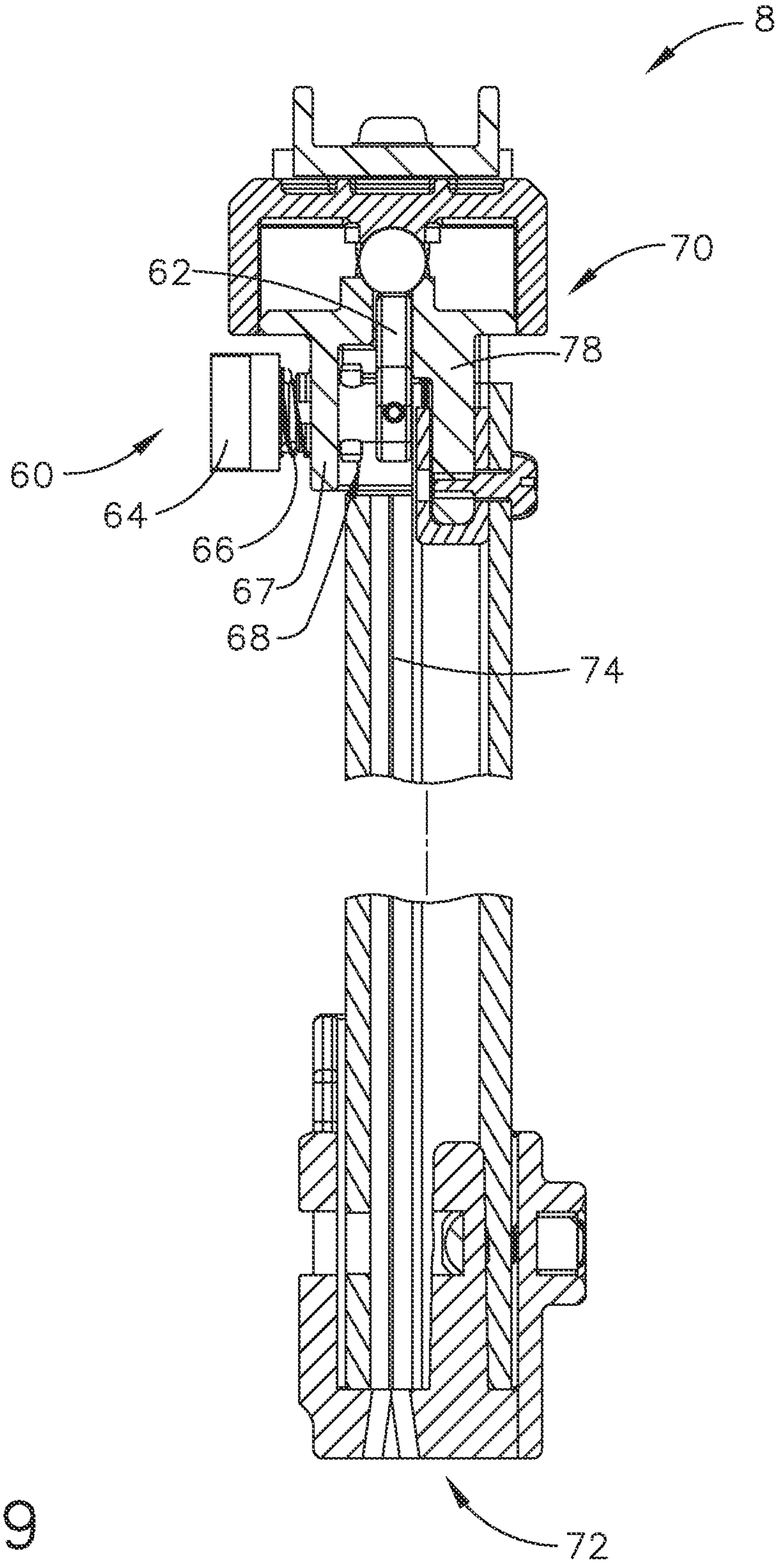
FIG. 9 is a cutaway view of the magazine of FIG. 2, along the section line 8-8, with the guide S/A engaged.

FIGS. 8 and 9 illustrate the magazine 8 along the section line 8-8 of FIG. 2.

Referring now to FIG. 8, the disengaged position of the guide is shown in which the gate 62 is shown to the left (in this view) of the magazine's fastener track 74 in the pocket 68. As shown in FIG. 8, the gate 62 is completely out of the way of the magazine's fastener track 74 (because the knob 64 has become undepressed), thus providing clearance for longer fasteners 25 to exit the magazine 8 to be driven by the tool 10. When in this undepressed position, the knob 64 resides at a distal position that is spaced-apart from the surface of the fastener magazine 8, i.e., the surface of the mounting bracket 67.

Note that the gate 62 is positioned in a "first plane" in FIG. 8, in which that first plane corresponds to a vertical line (in this view) that runs through the center of the gate 62, which is at its non-engaged position within the pocket 68. In other words, the "first plane" intersects that pocket 68.

As can be seen in FIG. 8, the user-actuatable knob 64 is extended from the vertical mounting bracket 67, due to the biasing action of the spring 66, along the knob's stem 69. This positioning of the knob also causes the gate 62 to be positioned in the "first plane," which is within the pocket 68.

Referring now to FIG. 9, the engaged position of the guide is shown in which the gate 62 is shown in the middle of the magazine's fastener track 74 out of the pocket 68. In FIG. 9, the gate 62 will interfere with longer fasteners 25 such that longer fasteners cannot exit the magazine 8 to be driven. However, in the engaged position the gate 62 will not interfere with shorter fasteners 24, and will instead direct them out of the tool such that each fastener will not completely "backtrack." The term "backtrack" is defined herein as a fastener "dropping" out of the guide body 36 at an angle that will cause the fastener to move back into the magazine 8, causing a potential jam condition. Note that the gate 62 is positioned in a "second plane" in FIG. 9, in which that second plane corresponds to a vertical line (in this view) that runs through the center of the gate 62, which is at its engaged position out of the pocket 68.

As can be seen in FIG. 9, the user-actuatable knob 64 is not extended from the vertical mounting bracket 67, and instead, is positioned proximal to that mounting bracket. This positioning of the knob also causes the gate 62 to be positioned in the "second plane," which is outside of the pocket 68. In this "second plane" position, the gate 62 is directly in the magazine's fastener track 74 and, thus, acts as a guide for shorter nails, and also acts as a blocking component for the longer nails. Note that the "first plane" and the "second plane" are substantially parallel to one another.

When in the depressed position as illustrated in FIG. 9, the knob 64 resides at a proximal position with respect to the surface of the fastener magazine 8, i.e., the surface of the mounting bracket 67. To arrive at this proximal position, the knob 64 is first pushed toward that mounting bracket 67, and then rotated. The user's hand can then be removed from the knob 64, which will remain in that proximal (depressed) position, because the knob holding pin acts as a detent that holds the knob in that depressed (engaged) position.

Figure 10:
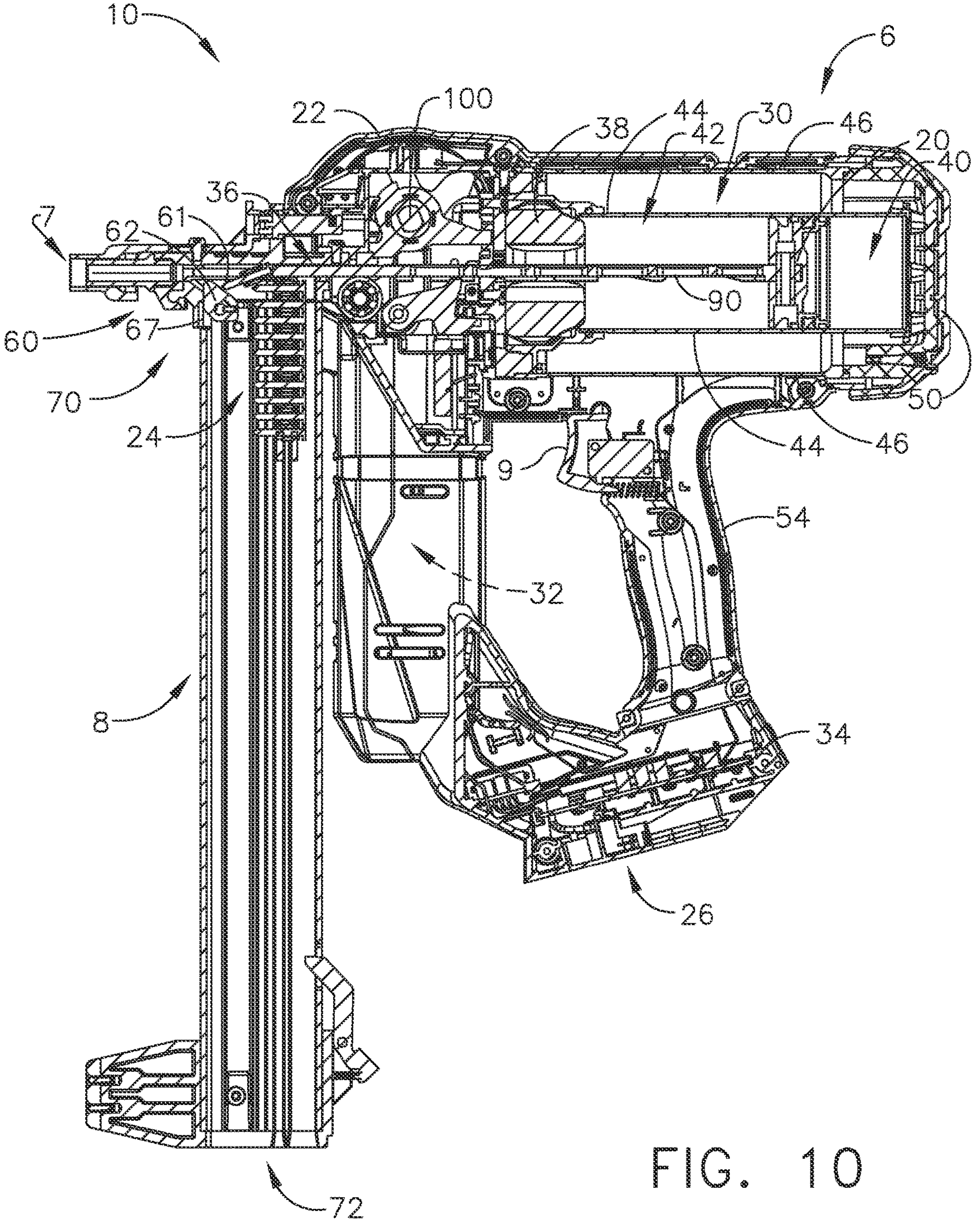
FIG. 10 is a left side cutaway view of the magazine attached to the tool of FIG. 1, showing the guide S/A directing a fastener of shorter lengthy shortly after a drive stroke begins.
Figure 11:
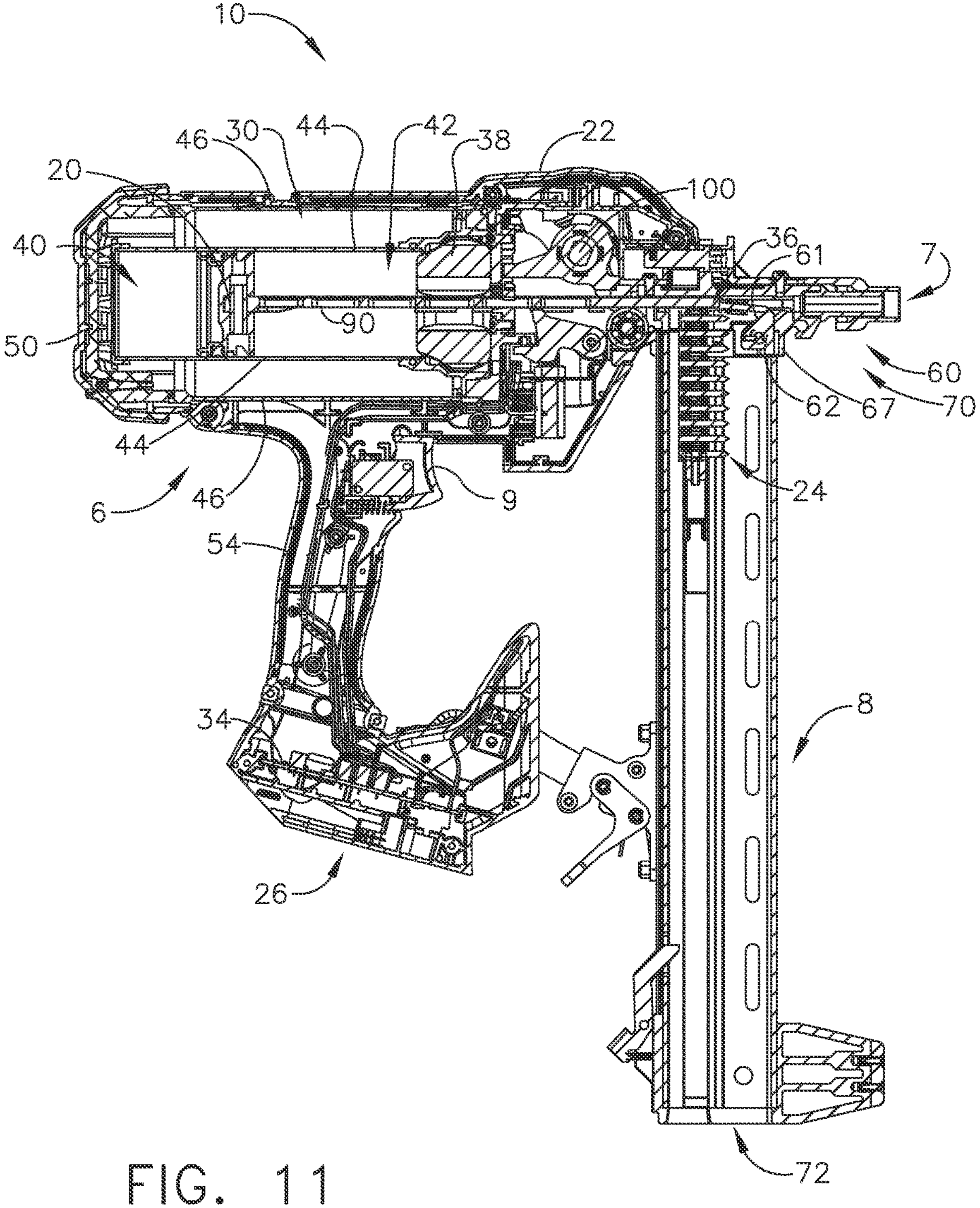
FIG. 11 is a right side cutaway view of the magazine attached to the tool of FIG. 1, showing the guide S/A directing a fastener of shorter length as the drive stroke continues towards the fastener exit portion of the tool.
Figure 12:
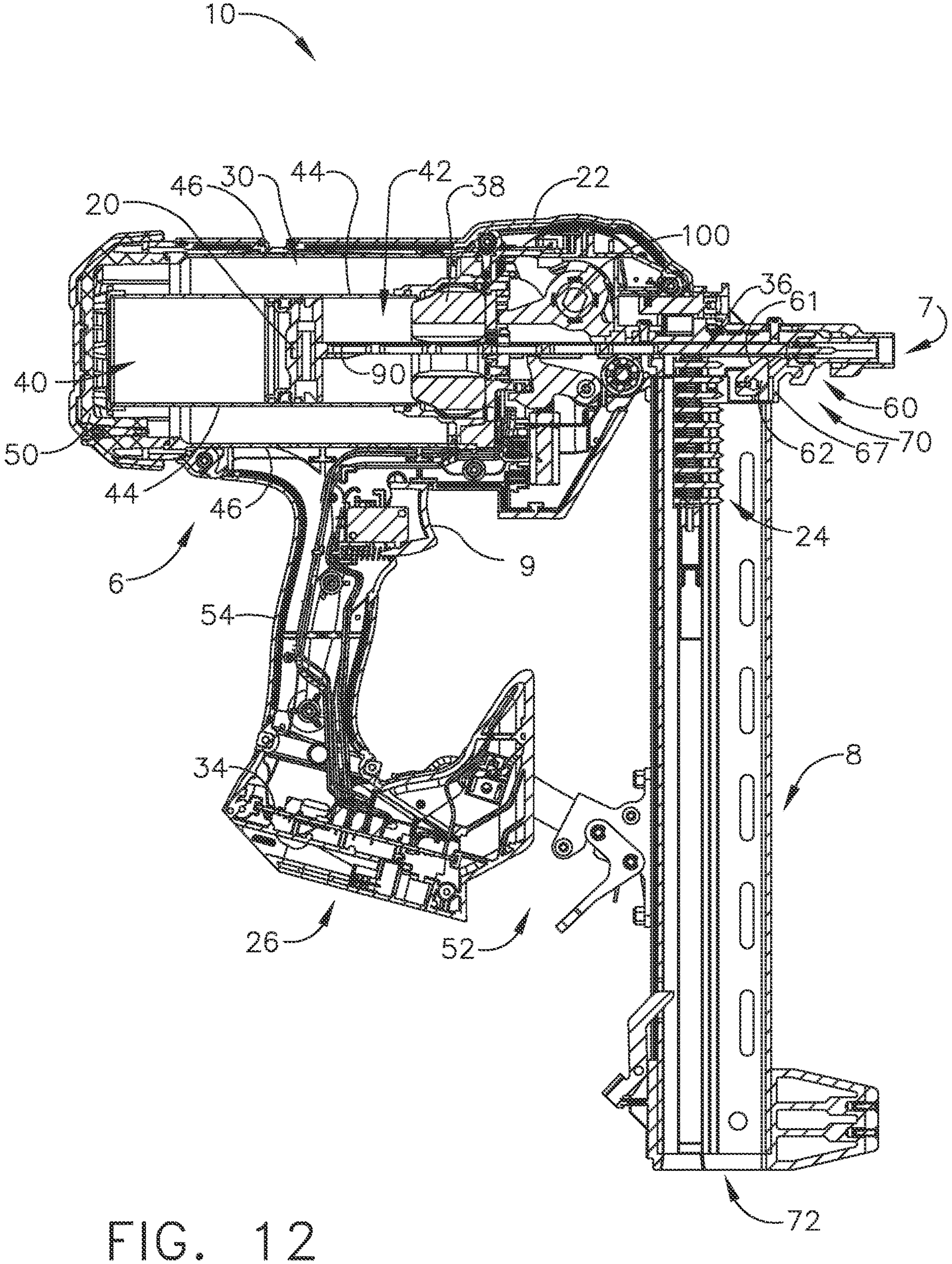
FIG. 12 is a right side cutaway view of the magazine attached to the tool of FIG. 1, showing a fastener of shorter length beyond the guide S/A as the drive stroke continues towards the fastener exit portion of the tool.

FIGS. 10-12 illustrate how, in an engaged position, the guide S/A 60 directs misaligned fasteners out of the tool, thus preventing complete backtracking.

It should be noted that FIGS. 5 and 6 illustrate the tool 10 in a "ready" position; i.e., the tool is ready to drive a fastener into a workpiece. The movable piston 20 is near the top of the working cylinder 44, and one fastener is loaded in the guide body 36.

In FIG. 10, the piston 20 begins a drive stroke (i.e., the piston begins moving toward the piston stop 38 and exit end 7) and the fastener 24 is separated from the fastener strip. Note that the fastener 24, as illustrated, has started to backtrack into the magazine 8. However, the fastener has only backtracked onto the ramp portion 61 of the gate 62. The fastener will make physical contact with the ramp portion 61, and that ramp portion will then prevent the fastener 24 from completely backtracking into the magazine 8, and instead begins to direct the fastener towards the exit end 7. The ramp portion 61 of the gate 62 is sized and shaped to re-direct a fastener that is to be driven by the tool's moving driver 90, if that fastener becomes misaligned as it is in the process of being driven, while being fed from the magazine 8.

Next, in FIG. 11, the piston 20 continues its drive stroke, and the fastener 24 is directed further along the ramp portion 61 of the gate 62. At this point, the fastener has almost been directed past the magazine, and is "aiming" toward the proper orientation to move farther along the fastener track of the nosepiece.

Last, in FIG. 12, the piston 20 is over halfway through its drive stroke, and the fastener 24 has been directed beyond the magazine past the "backtrack" point. The ramp portion 61 does not interfere with the driver 90, and the fastener is almost out of the nosepiece exit end 7 of the tool 10. After the fastener 24 is driven into a workpiece, the lifter 100 returns the driver 90 and piston 20 back to a ready position, and the next fastener is advanced from the magazine 8. In this manner, each fastener is directed via the ramp portion 61 and then driven into a workpiece during a drive stroke of the tool.

In FIGS. 11 and 12, it can be seen that the fasteners (e.g., nails) are spaced-apart, while residing in the magazine's fastener track 74. In the examples illustrated in the drawings provided herein, these fasteners are rather large-diameter nails, with 'normal' heads that would be found on a framing-type nail, which is why the nails are provided in a spaced-apart configuration. Moreover, such nails, being spaced-apart as illustrated, are arranged in a parallel pattern, and thus, the magazine 8 is essentially perfectly straight from its first end at the top (on FIG. 11) down to its second (bottom) end, along a longitudinal axis that extends between those two ends.

For the tool 10 that is illustrated in FIGS. 11 and 12, the nails are typically provided in a collated strip, and thereby held in place (in that parallel pattern) by that collated strip. Many conventional nailer tools use such collated strips, and many of those strips are made of a flexible plastic material that is strong enough to allow the nails to be handled without falling out of the strip, or tearing the strip, while the human user installs the strip into the magazine. Once the strip has been installed, a pusher 76—also sometimes referred to as a "feeder carriage"—that is part of the magazine applies an upward force (in the orientation that is illustrated in FIGS. 11 and 12) against the nails that tends to force the collated strip of nails toward the fastener receiving area of the driver/fastener track 94 inside the guide body 36 of the tool 10 (i.e., toward the first (top) end of the magazine). Once the leading nail has entered the driver/fastener track 94, it will be in the proper position to be forcibly pushed out through the nosepiece 92 at the exit end 7 of the tool, by the driver 90. It will be understood that the plastic material of the collated strip of nails also has the attribute in which it will rather easily be torn apart right at the portion where the leading nail resides at the moment that the nail is being driven from the driver/fastener track 94, by the movable driver 90.

Finally: smaller nails, especially nails with very small heads—commonly referred to as "finishing nails"—may also be used with the technology disclosed herein. However, such nails are typically lightly glued together along their shafts, instead of being mounted in a plastic collated strip, and spaced-apart. Since such finishing nails actually have a small head, however, when they are glued together they therefore become arranged in a shape that is slightly curved, and thus, their magazines must also be slightly curved to match that shape. Nevertheless, if the designer of the magazine wishes to make it possible to use more than one length of finishing nails with a single magazine, then the guide/blockout S/A 60 disclosed herein may be used with such finishing nails to prevent the shorter nails (that are usable with that magazine) from completely backtracking as they are being pushed into the driver/fastener track of that tool. (The guide S/A 60 also has the ability to "block" longer nails (otherwise usable with that magazine) from being fed through the top of the magazine, into the guide body, hence the term "blockout" can be used for this subassembly 60.)

Figure 13:
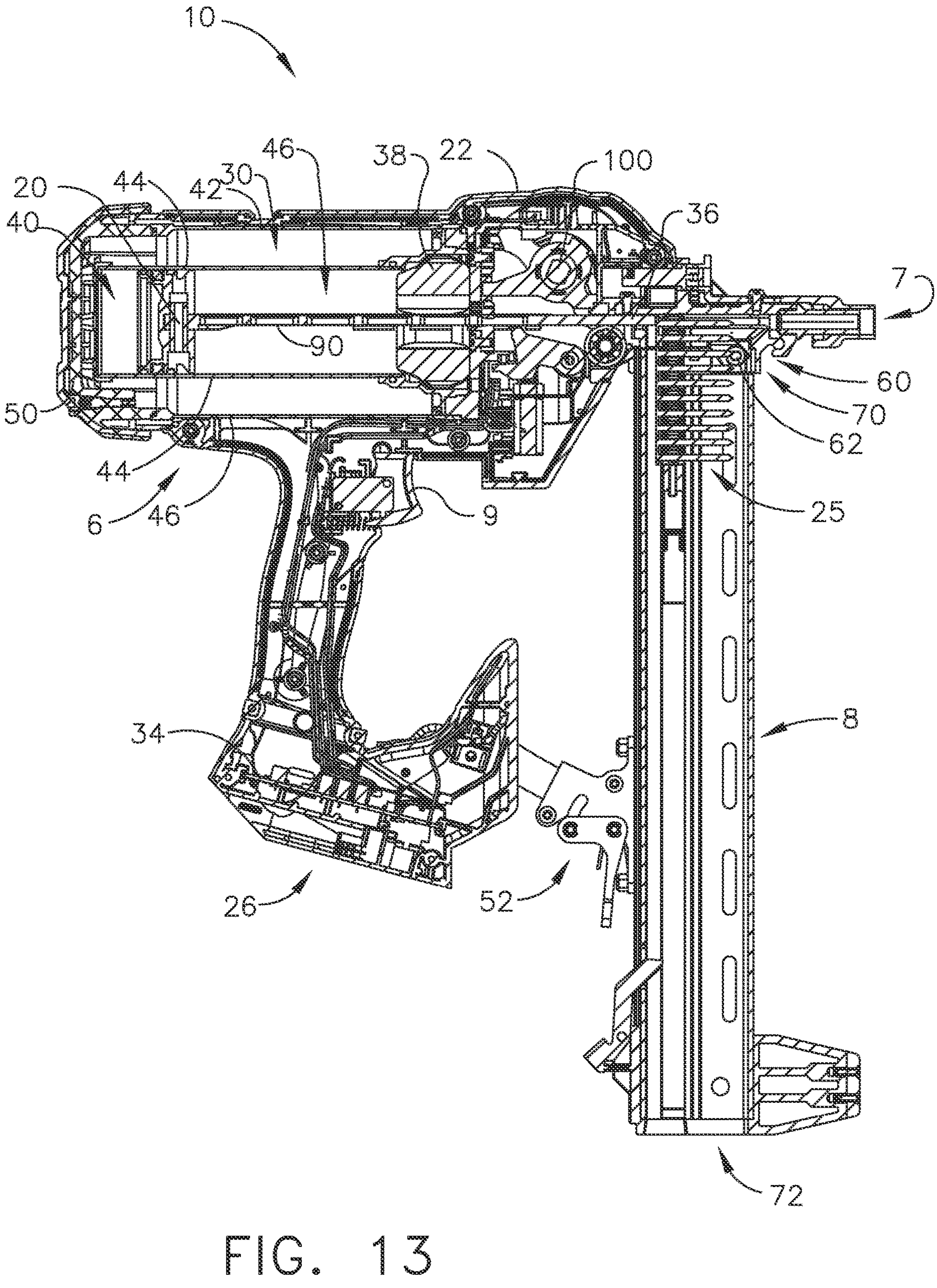
FIG. 13 is a right side cutaway view of the magazine attached to the tool of FIG. 1, showing a fastener of longer length in the magazine.

Referring now to FIG. 13, the magazine 8 is illustrated with a fastener strip of longer fasteners 25 loaded in the magazine. When the guide S/A 60 is in a disengaged mode, the guide S/A does not interfere with the movement of the longer fasteners 25 as they move from the magazine 8 to the guide body 36 during normal operation. In the disengaged mode, the gate 62 has moved to the side of the magazine's fastener track 74 (i.e., into the pocket 68), thereby allowing unimpeded movement of the longer fasteners 25.

Figure 14:
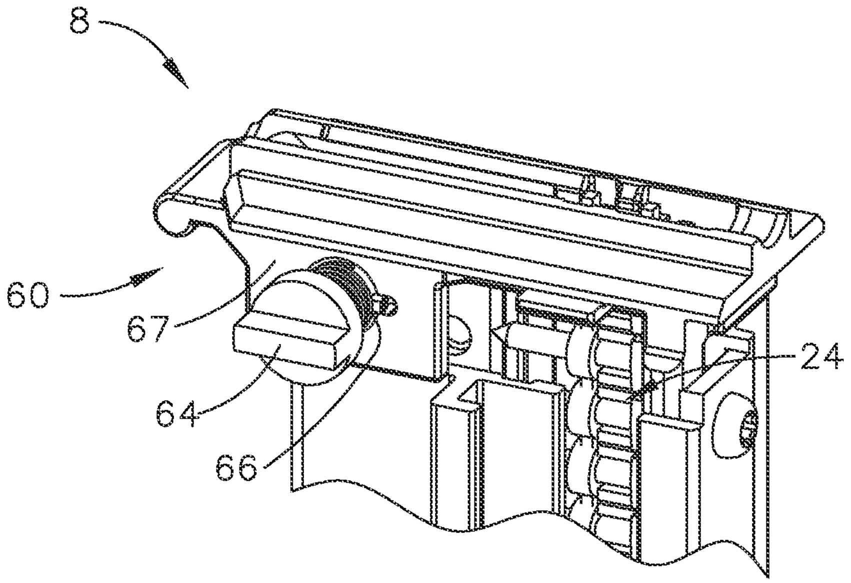
FIG. 14 is a perspective view of the magazine of FIG. 1, showing the guide S/A in a disengaged position.

Referring now to FIG. 14, the guide S/A 60 is illustrated in a disengaged position. The spring 66 has biased the knob 64 away from the mounting bracket 67 and the magazine 8. Although not visible in this view, the movable gate 62 is in the pocket 68. The ramp portion 61 is pivoted in a direction towards the bottom of the magazine 72 (see FIG. 6).

Figure 15:
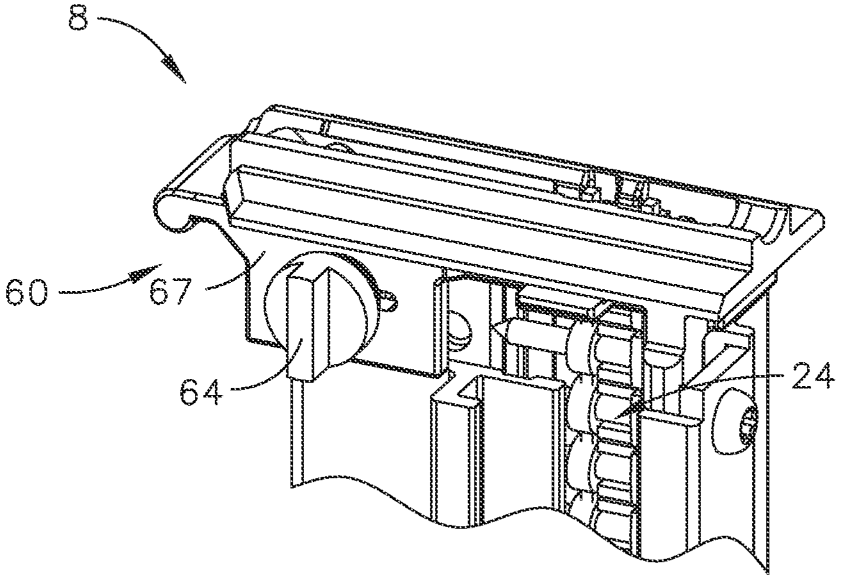
FIG. 15 is a perspective view of the magazine of FIG. 1, showing the guide S/A in an engaged position, used with a fastener of shorter length.

Referring now to FIG. 15, the guide S/A 60 is illustrated in an engaged position. A human user has turned the knob 64 counterclockwise and pushed the knob towards the mounting bracket 67 and the magazine 8. Although not visible in this view, the spring 66 has forced the movable gate 62 into the magazine's fastener track 74. The movable gate 62 has pivoted so that the ramp portion 61 will engage with a fastener 24 during a driving stroke of the tool 10 (see FIG. 7).

Figure 16:
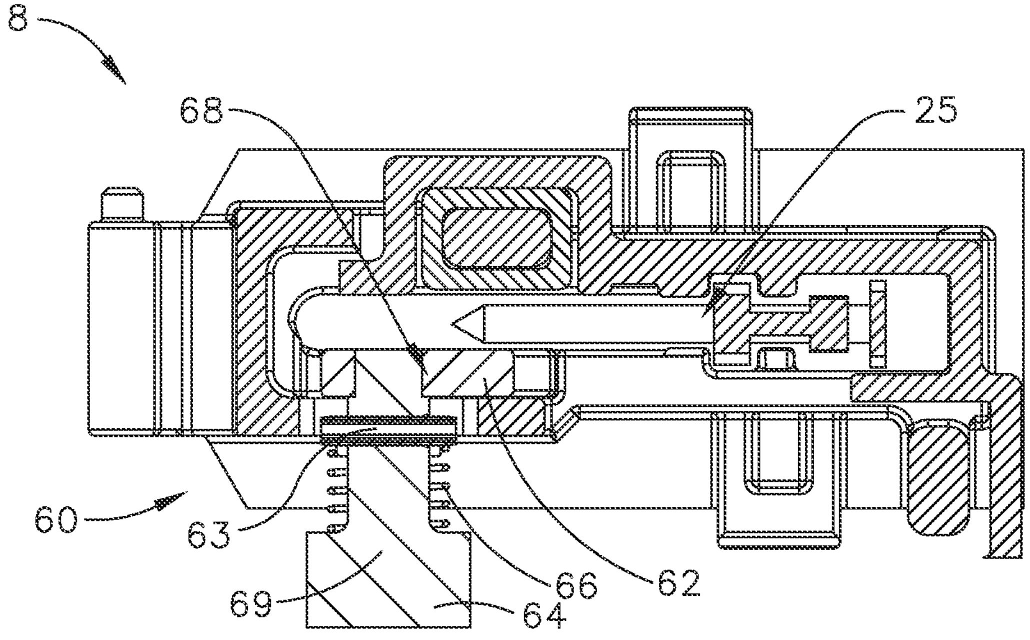
FIG. 16 is a top cutaway view of the magazine of FIG. 1, showing the guide S/A in a disengaged position, used with a fastener of longer length.

Referring now to FIG. 16, the guide S/A 60 is illustrated in a disengaged position. The spring 66 is secured to the knob holding pin 63 (which could also be referred to as a "knob mounting pin" 63). In the disengaged position, the knob holding pin 63 pivots the spring 66 so that the spring biases the knob 64 away from the magazine 8. The knob holding pin 63 pivots so that it does not rest on an interior portion of the mounting bracket 67.

Note that the longer fastener 25 is sufficiently long that, if the movable gate 62 was not out of the way and positioned in the pocket 68, the longer fastener would not be able to feed into the guide body 36. Therefore, to use the longer fasteners in the illustrated embodiment, the knob 64 and gate 62 must be in the disengaged position to be able to feed the longer nails from the magazine fastener track 74, and out the top (the first end) of the magazine.

Figure 17:
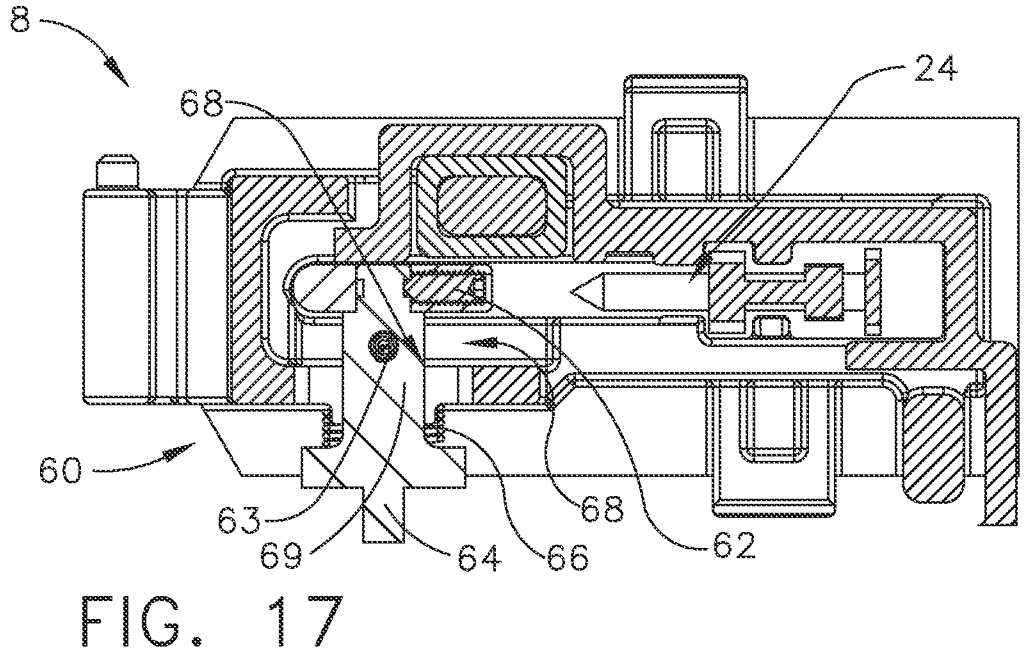
FIG. 17 is a top cutaway view of the magazine of FIG. 1, showing the guide S/A in an engaged position, used with a fastener of shorter length.

Referring now to FIG. 17, the guide S/A 60 is illustrated in an engaged position. In the engaged position, the knob holding pin 63 pivots along with the movable gate 62, which in turn compresses the spring 66 since the knob 64 is pushed in a direction towards the magazine 8. As a result, the movable gate 62 pivots out of the pocket and the ramp portion 61 pivots towards the top (or the "exit end") of the magazine 70. The knob holding pin 63 moves just enough to "hold" the guide S/A 60 in place by resting on an interior portion of the mounting bracket 67. In FIG. 17, shorter fasteners 24 are illustrated. The shorter fasteners 24 are not long enough to interfere with the movable gate 62 when the guide S/A 60 is in the engaged position.

Figure 18:
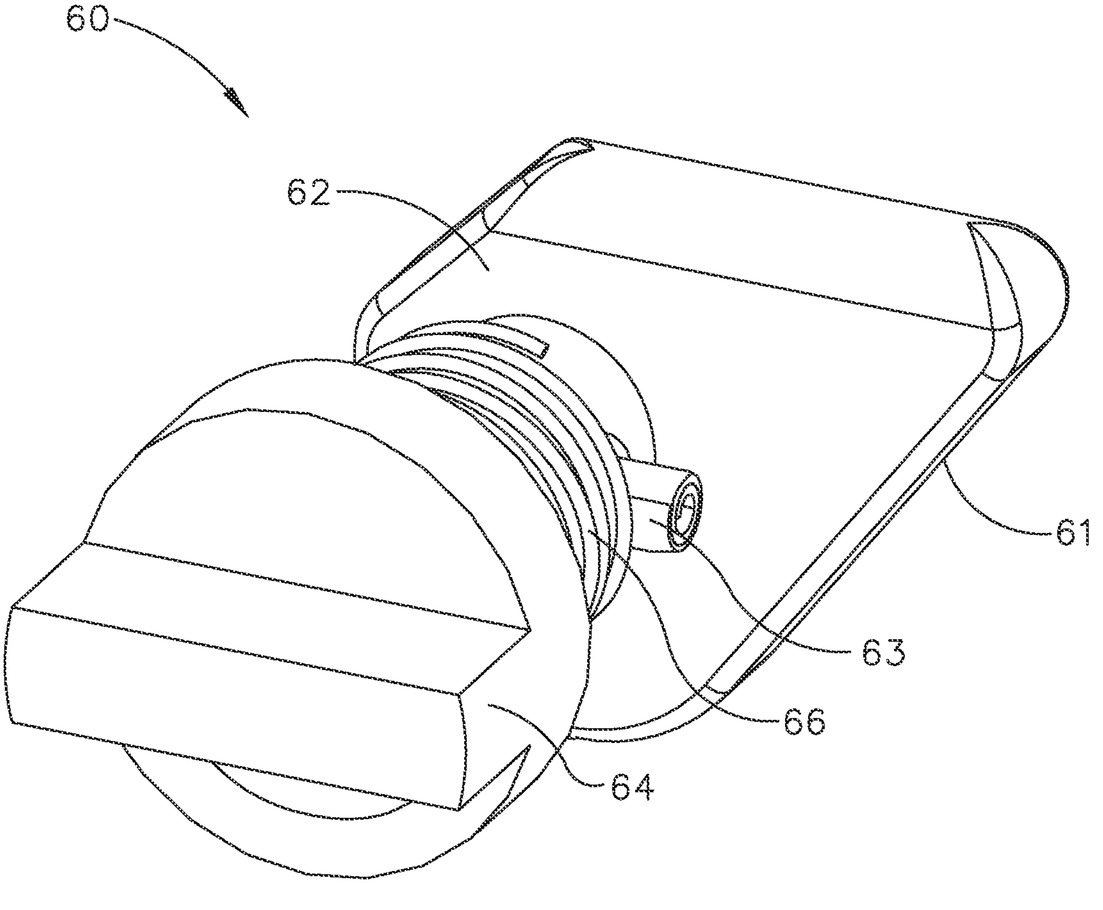
FIG. 18 is a perspective view showing details of the adjustable knob, used in the guide S/A, constructed according to the principles of the magazine of FIG. 1.

Referring now to FIG. 18, the guide S/A 60 is shown in a perspective view. Note that FIG. 18 illustrates the disengaged position. The spring 66 is secured to the knob holding pin 63. The ramp portion 61 is pivoted in a downward position.

Figure 19:
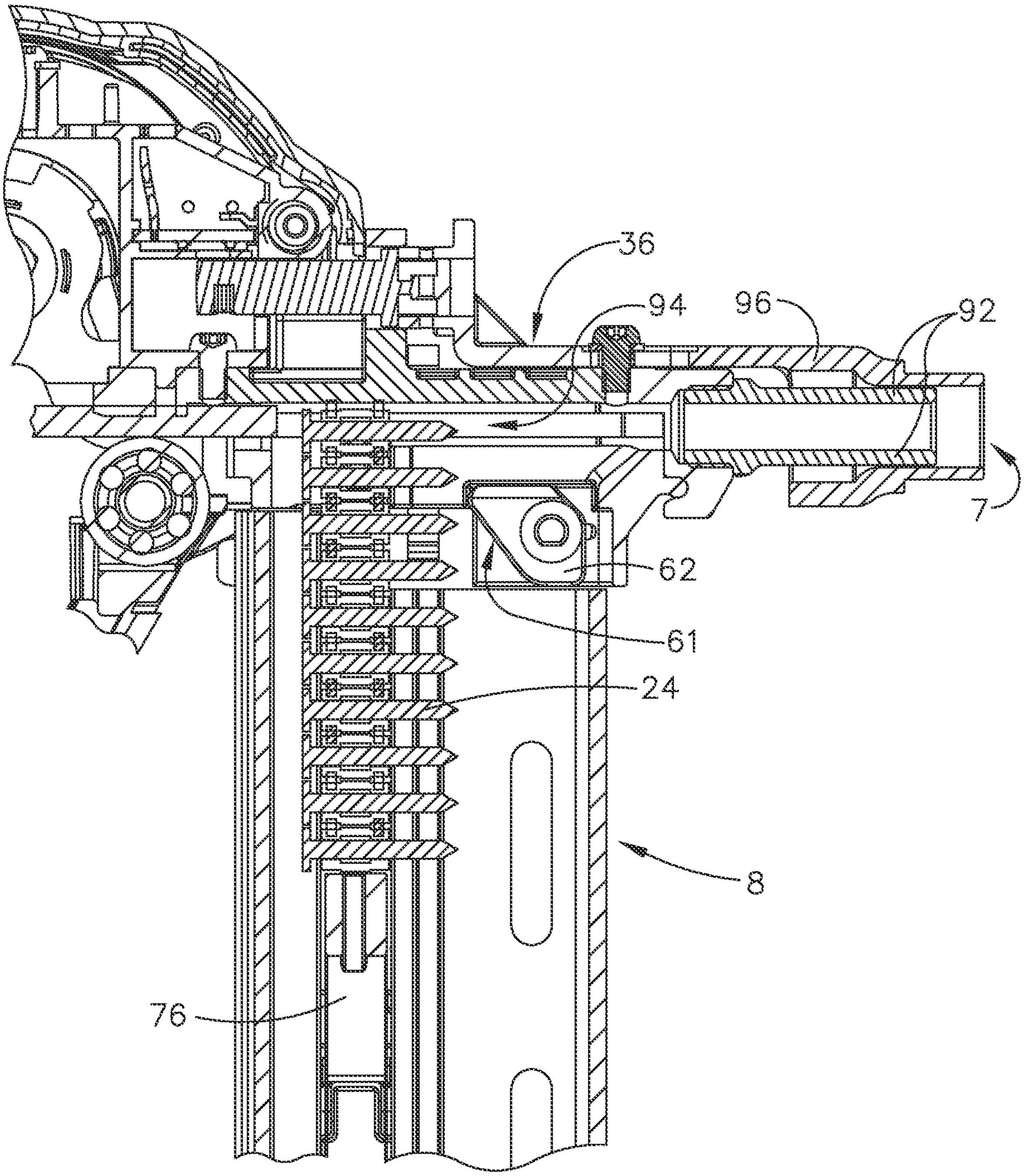
FIG. 19 is an enlarged side elevational view in partial cross-section of the guide S/A of FIG. 6, with the gate in its disengaged position.

Referring now to FIG. 19, portions of the guide S/A 60 are illustrated showing with the movable gate 62 in its disengaged position. (The illustrated fasteners are of the "short" variety in this view.) The "lead" fastener 24 is just entering the driver/fastener track 94 of the guide body 36, and will soon be in its proper position to be driven through the nosepiece 92, and out the exit end 7 of the tool. Since the ramp 61 of the gate 62 is facing downward (in this view), it is in a non-interfering position with respect to the movements of the fasteners 24 as they are being driven through the driver/fastener track 94. But since "short" nails sometimes tend to 'fall' outside the driver/fastener track 94 as they are exiting the tool, this is not the recommended position for the gate 62, for use with these "short" nails.

Figure 20:
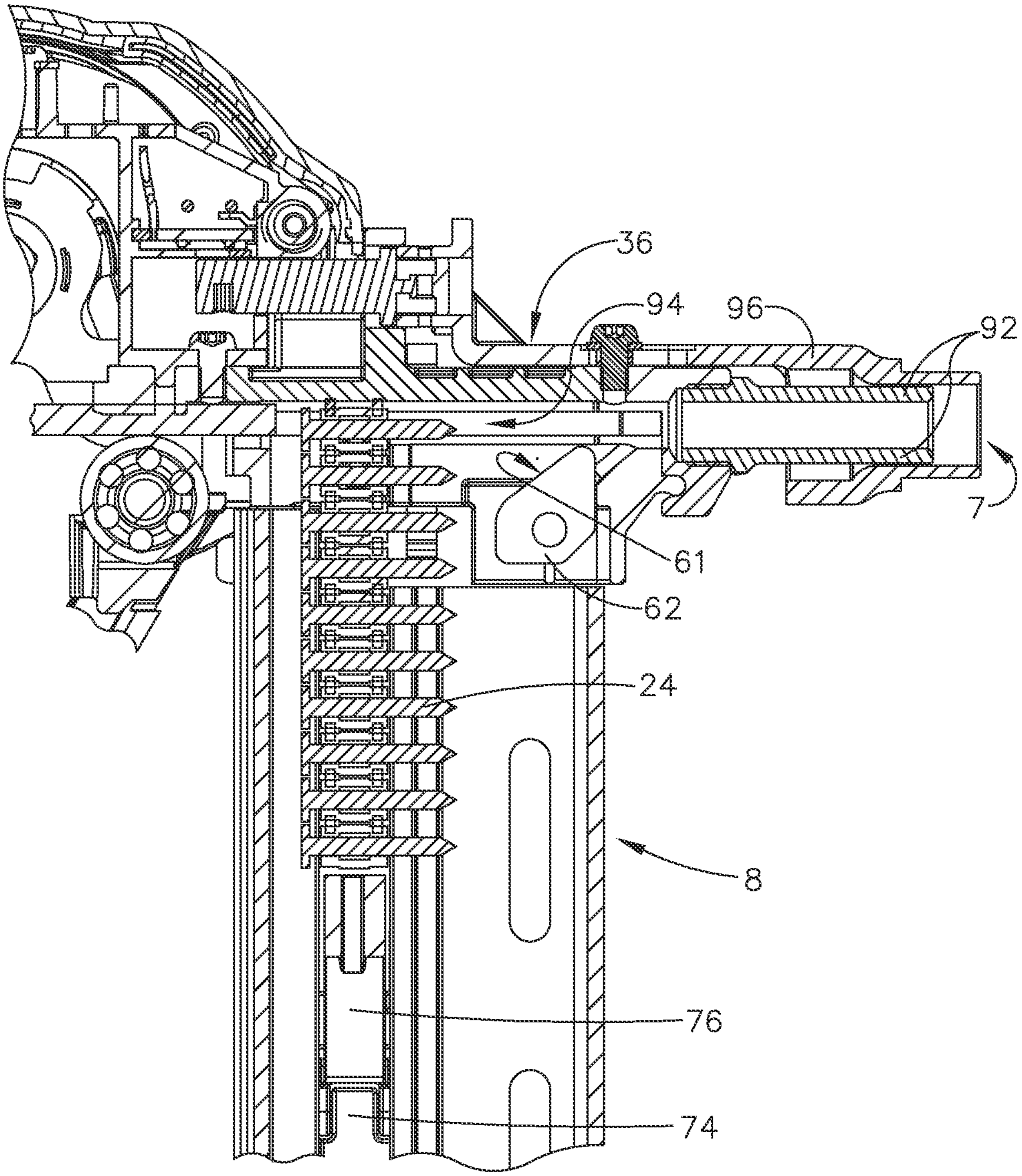
FIG. 20 is an enlarged side elevational view in partial cross-section of the guide S/A of FIG. 7, with the gate in its engaged position.

FIG. 20 is an enlarged side elevational view of the guide S/A of FIG. 7, with the ramp in its engaged position. The "lead" fastener 24 (a "short" fastener) is just entering the driver/fastener track 94 of the guide body 36, and will soon be in its proper position to be driven through the nosepiece 92, and out the exit end 7 of the tool. Since the ramp 61 of the gate 62 is facing upward (in this view), it is in an interfering position with respect to the movements of the fasteners 24 if they become misaligned as they are being driven through the driver/fastener track 94. Therefore, if one of those fasteners starts to "backtrack," the ramp 61 will prevent complete backtracking from occurring. (See FIG. 21.) For such "short" fasteners, this orientation of the gate 62 is the recommended position.

Figure 21:
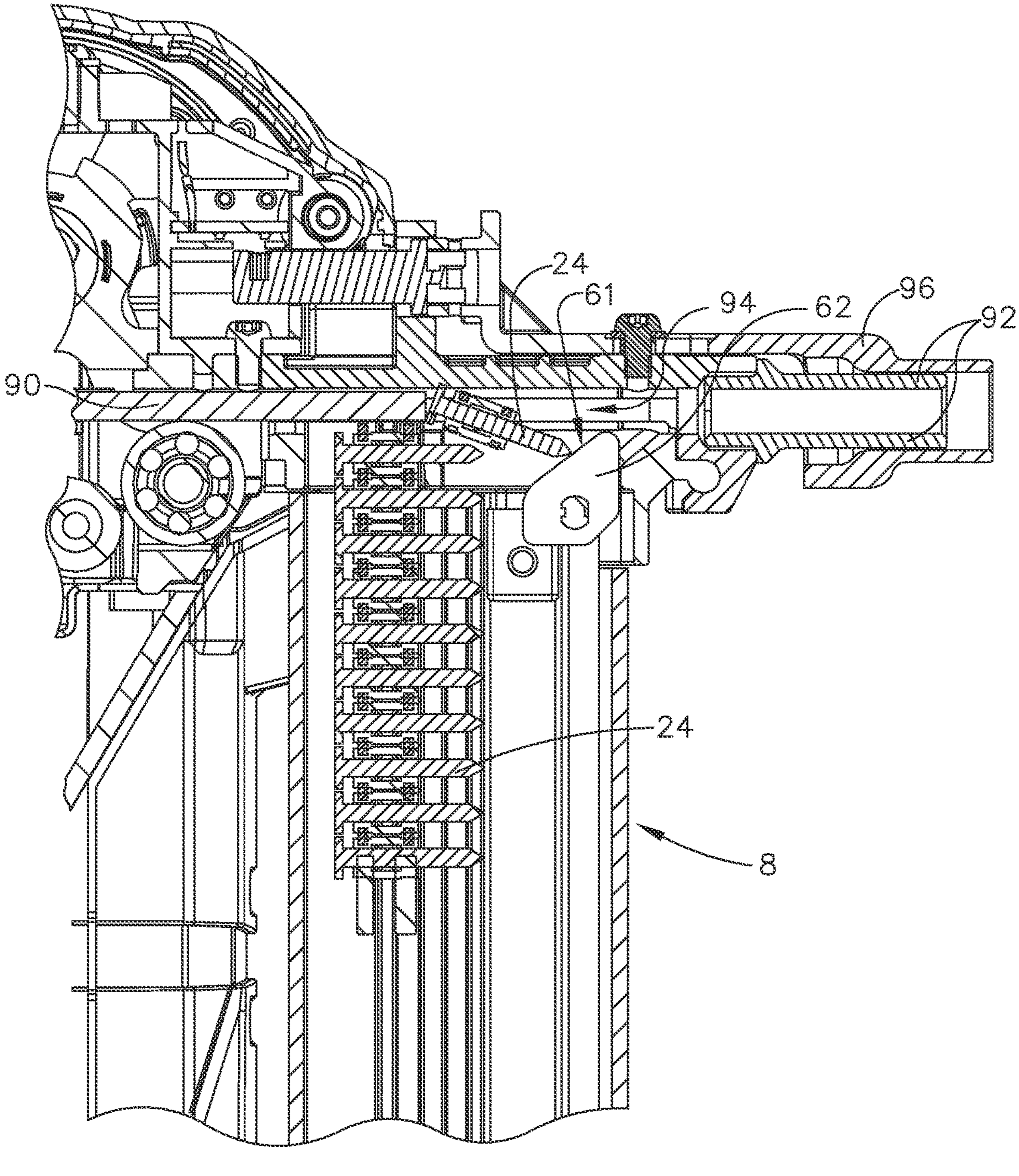
FIG. 21 is an enlarged side elevational view in partial cross-section of the guide S/A of FIG. 10, as a mirror image, with the gate in its engaged position.

FIG. 21 is an enlarged side elevational view of the guide S/A of FIG. 10, in a mirror image, with the ramp in its engaged position. The "lead" fastener 24 has started to "backtrack" as it is being driven by the driver 90. However, the ramp 61 is being contacted by the front tip of that lead fastener, and will 're-aim' (or 'guide') the lead fastener, in real time, back into its correct pathway, which is the driver/fastener track 94. This mechanical interfering contact between the fastener and the ramp of the movable gate 62 prevents complete backtracking from occurring, thus preventing a possible jam.

Figure 22:
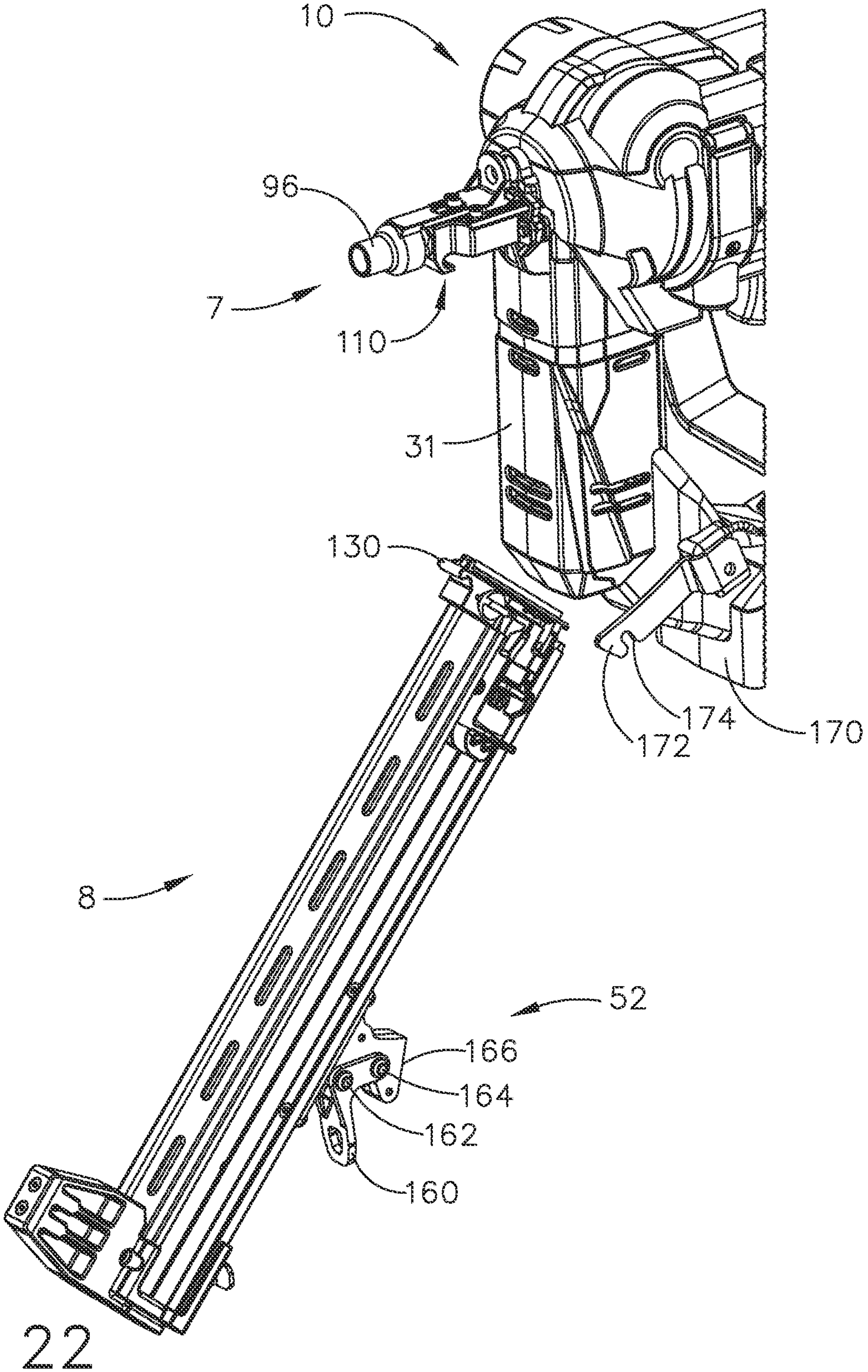
FIG. 22 is a front, left perspective view of a second embodiment fastener magazine and fastener driving tool, showing the magazine ready to pivotably attach to the tool.

Referring now to FIG. 22, a second embodiment fastener magazine 8 for a fastener driving tool 10 is illustrated in a front quarter perspective view. FIG. 22 depicts a first step in attaching the magazine 8 onto the tool 10. In this first step, a human user positions the magazine 8 at an angle to the tool 10 in order to line up a fulcrum 130 on the magazine with a rounded receptacle subassembly 110 on the tool. The rounded receptacle S/A 110 exhibits an overall cylindrical shape.

The tool 10 has a nosepiece 92, and the rounded receptacle subassembly ("S/A") 110 on the guide body 36 proximal to the nosepiece. This rounded receptacle S/A is also sometimes referred to herein as a first attachment point.

The magazine 8 exhibits the fulcrum 130 proximal to the fastener exit portion of the guide body. The magazine 8 also includes a magazine latch release handle 160 (manually operated), a magazine latch pivot pin 162, a magazine latch pin 164, and a magazine latch contact support 166. The magazine latch contact support 166 mates with a tool bracket 172 (also sometimes referred to herein as a second attachment point). A tool contact support structure 170 holds the tool bracket 172. A curved opening 174 on the tool bracket 172 receives the magazine latch pin 164. These components 160, 162, 164, and 166 are all part of the latch subassembly 52.

Figure 23:
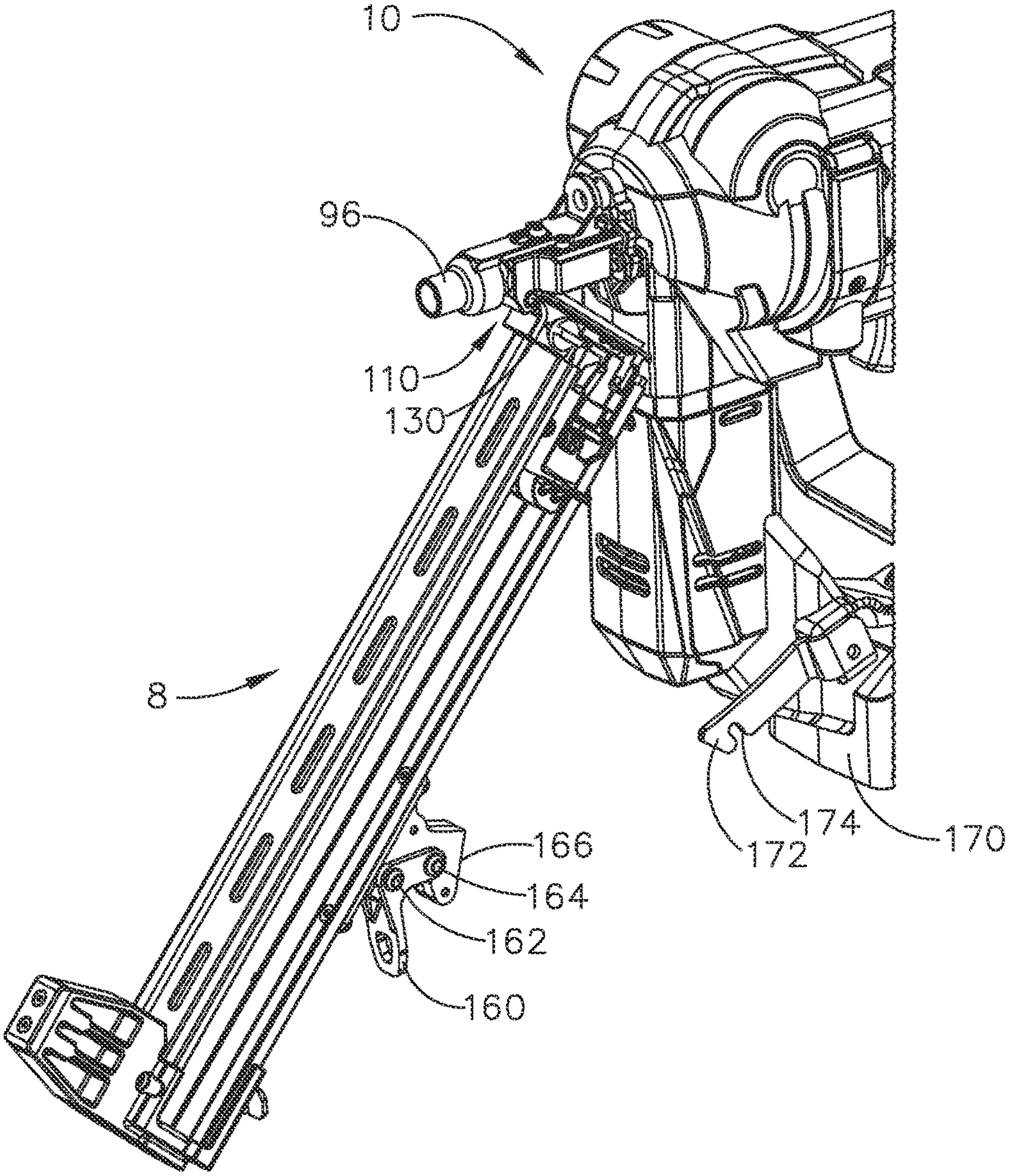
FIG. 23 is a front, left perspective view showing the magazine partially pivoted and partially attached to the tool of FIG. 22.

Referring now to FIG. 23, a second step of attaching the magazine 8 to the tool 10 is depicted. In this second step, a human user pivotably attaches the magazine to the tool by inserting the magazine's fulcrum 130 into the tool's rounded receptacle S/A 110. In this second stage, the magazine 8 is now pivotably movable towards the tool 10, while the fulcrum 130 is engaged with the rounded receptacle S/A 110. While the magazine is being mounted to the tool, the fulcrum portion (at the fulcrum center 132) is rotated about the geometric center 114 of the opening 116 in the backplate 152.

Note that the magazine 8 can only pivot towards the tool 10 in a single plane of motion, without significant deviation from that single plane, because the fulcrum 130 is engaged with the rounded receptacle S/A 110. This engagement prevents significant movement of the magazine outside the pivotable plane of the magazine as it is moved toward the tool. That is, the overall shape and structure of the fulcrum 130 and the cylindrical opening 112 of the receptacle S/A 110 (see FIG. 26) together prevent the magazine from moving in any other plane, once the fulcrum 130 (which in this embodiment has a significant width dimension that is larger in size than its rounded outer diameter) is initially placed into that cylindrical opening 112. (Also see FIGS. 27 and 29 for approximate size and shape relative dimensions of the fulcrum 130 of the illustrated embodiment. See description below.) Another way of stating this movement is to say that the fastener magazine 8 is rotatable in a planar direction toward the body of the tool, once the side protrusion 136 has been engaged with the opening 116 of the backplate.

Figure 24:
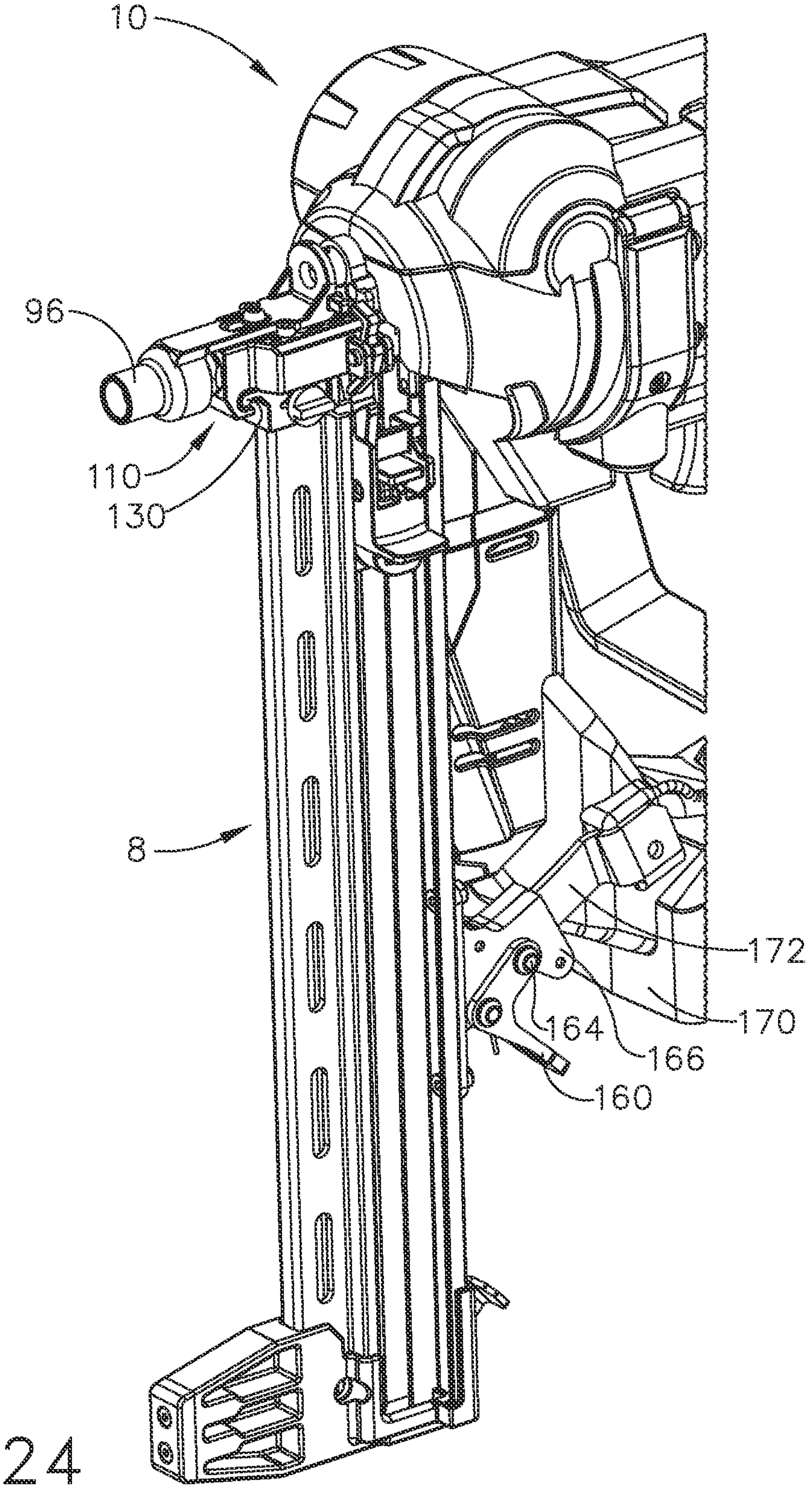
FIG. 24 is a front, left perspective view showing the magazine fully pivoted and attached and secured to the tool of FIG. 22.

Referring now to FIG. 24, the third and final step of attaching the magazine 8 to the tool 10 is depicted. FIG. 24 shows the magazine 8 fully pivoted and attached to the tool 10. The magazine 8 is engaged with the round receptacle S/A 110 via the fulcrum 130, while also simultaneously being secured to the tool via the magazine latch pin 164 being engaged with the tool bracket 172. (In this arrangement, the magazine latch pin 164 acts as a "holding pin," by latching—via its curved opening 174—against the tool bracket 172.) As the magazine latch pin 164 becomes engaged with the tool bracket 172, the upper surface of the magazine's mounting bracket 150 is (simultaneously) pressed against the bottom portion 122 of the guide body 36.

The physical shapes of the upper portion of the magazine and the lower "receiving portion" of the guide body must, of course, correspond with each other, so as to be physically mate-able. The guide body includes a bottom portion 122 that receives the upper portion 150 of the magazine's mounting bracket, to accomplish that goal. The opening 116 in the backplate is sized and shaped to receive the side protrusion 136 of the fulcrum portion, and the rounded (cylindrical) opening 112 of the receiving portion (or receptacle portion) of the guide body is sized and shaped to receive the fulcrum's cylindrical outer surface 134. Further, there is a geometric center that is proximal to that rounded opening 112, which comes into play during the attaching of the magazine 8 to the tool 10.

To disengage the magazine 8 from the tool 10, a human user first manually actuates the magazine latch release handle 160. This movement disengages the magazine latch pin 164 from the tool bracket 172. Next, the human user then pivots the magazine 8 outwards and away from the tool 10, while the magazine's fulcrum 130 is still engaged with the tool's rounded receptacle S/A 110.

Figure 25:
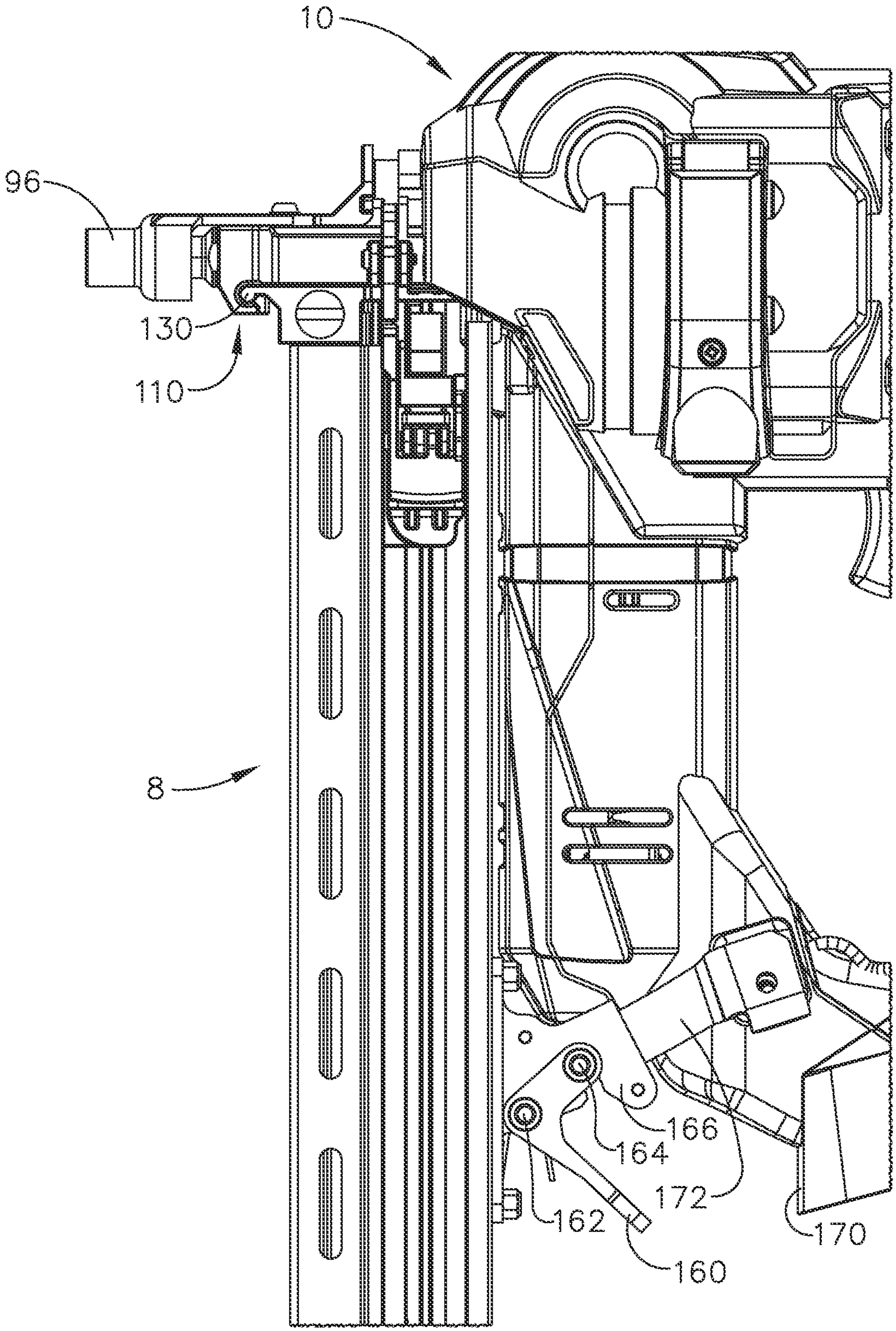
FIG. 25 is a left, side view showing the magazine attached to the tool of FIG. 22.

Referring now to FIG. 25, the magazine 8 is shown in a left, side view fully attached to the tool 10. This view shows how the fulcrum 130 fits rather snugly in the main opening 120—see below for more detail about these parts.

Figure 26:
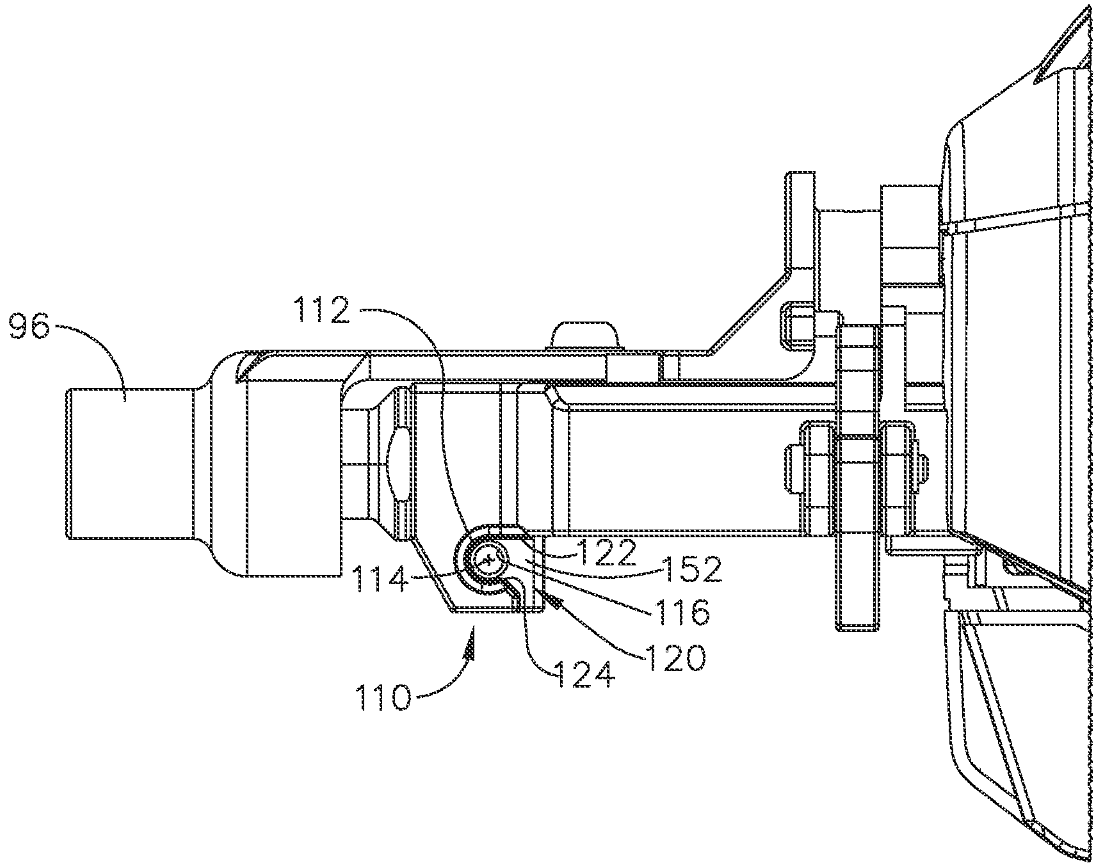
FIG. 26 is an enlarged left, side view showing a first magazine attachment pivot point of the tool of FIG. 22.

Referring now to FIG. 26, the nosepiece 92 and the rounded receptacle S/A 110 are shown enlarged in a left, side view. The rounded receptacle S/A 110 includes a cylindrical opening (or "female portion") 112, a geometric center 114, an opening in the backplate 116 of the guide body, a main opening 120, a substantially flat bottom portion 122 of the guide body, and a first corner 124 at the bottom portion of the main opening 120. This first corner 124 has the appearance of an edge in FIG. 28, but it is not a sharp edge, and thus it is relatively easy to slide the fulcrum 130 of the magazine past this first corner (or edge) 124; however, the first corner 124 does assist in retaining the fulcrum 130 in the main opening 120, once inserted.

When a human user begins attaching the magazine 8 to the tool 10, the fulcrum 130 is engaged with the rounded receptacle S/A 110 by moving the magazine's forward "male" extension portion 140 that includes the fulcrum 130 past the first corner 124, and then the magazine is pivoted toward the tool until it is securely latched. The "pivot point" of the magazine 8 with the tool 10 is at the geometric center 114. The fulcrum 130 portion of the magazine is secured not only with the rounded receptacle S/A 110, but also with the substantially flat bottom portion 122, helping to contain and engage the magazine in place when it is securely latched via the magazine latch pin 164 and the tool bracket 172.

Figure 27:
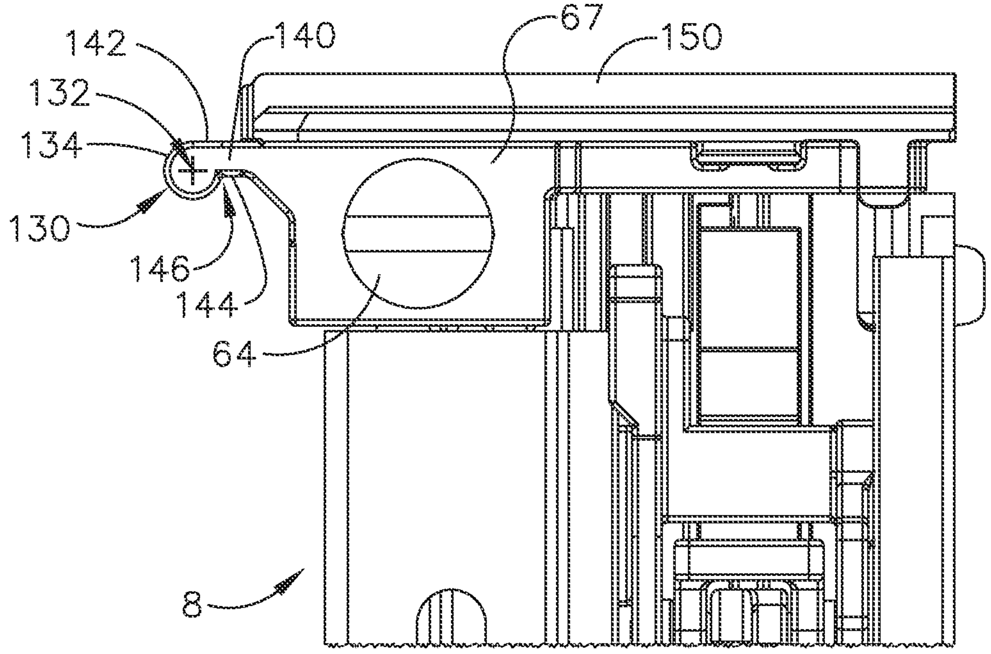
FIG. 27 is an enlarged left, side view of the magazine of FIG. 22, showing the corresponding magazine attachment pivot portion.

Referring now to FIG. 27, the magazine 8 is shown enlarged in a left, side view. The magazine 8 has an upper portion 150, which engages with the tool 10 when the magazine is attached to the tool. The magazine 8 also includes a fulcrum center (132) (or "pivot axis" or "pivot point"), a cylindrical outer surface 134 that fits into the round receptacle S/A 110, a side protrusion 136 that is proximal to the cylindrical outer surface 134 of the fulcrum and which fits into the opening 116 in backplate 152, an extension portion 140 of the magazine's mounting bracket that extends to the fulcrum, an upper flat surface 142 of the extension portion, a lower flat surface 144 of the extension portion, and a second corner 146 at the intersection of the lower flat surface 144 and the cylindrical outer surface 134.

When the fulcrum 130 is engaged with the rounded receptacle S/A 110, the "pivot point" is at the geometric center 114 of the tool 10, and also simultaneously at the fulcrum center 132 of the magazine 8. Also, when engaged, the second corner 146 slides past the first corner 124, and the upper flat surface 142 is pressed against the (flat) bottom portion 122 of the guide body. (Note that the second corner 146 is an 'inner corner' while the first corner 124 is an 'outer corner.') These details about this construction help ensure that the magazine 8 will stay engaged with the tool 10, even though the primary secure latching point is the magazine latch pin 164 and the tool bracket 172 (i.e., at the second attachment point between the tool and the magazine). These physical details also help to guide a human user to naturally pivot and engage the magazine 8 with the tool 10 without a struggle to "fit" the magazine into place.

Figure 28:
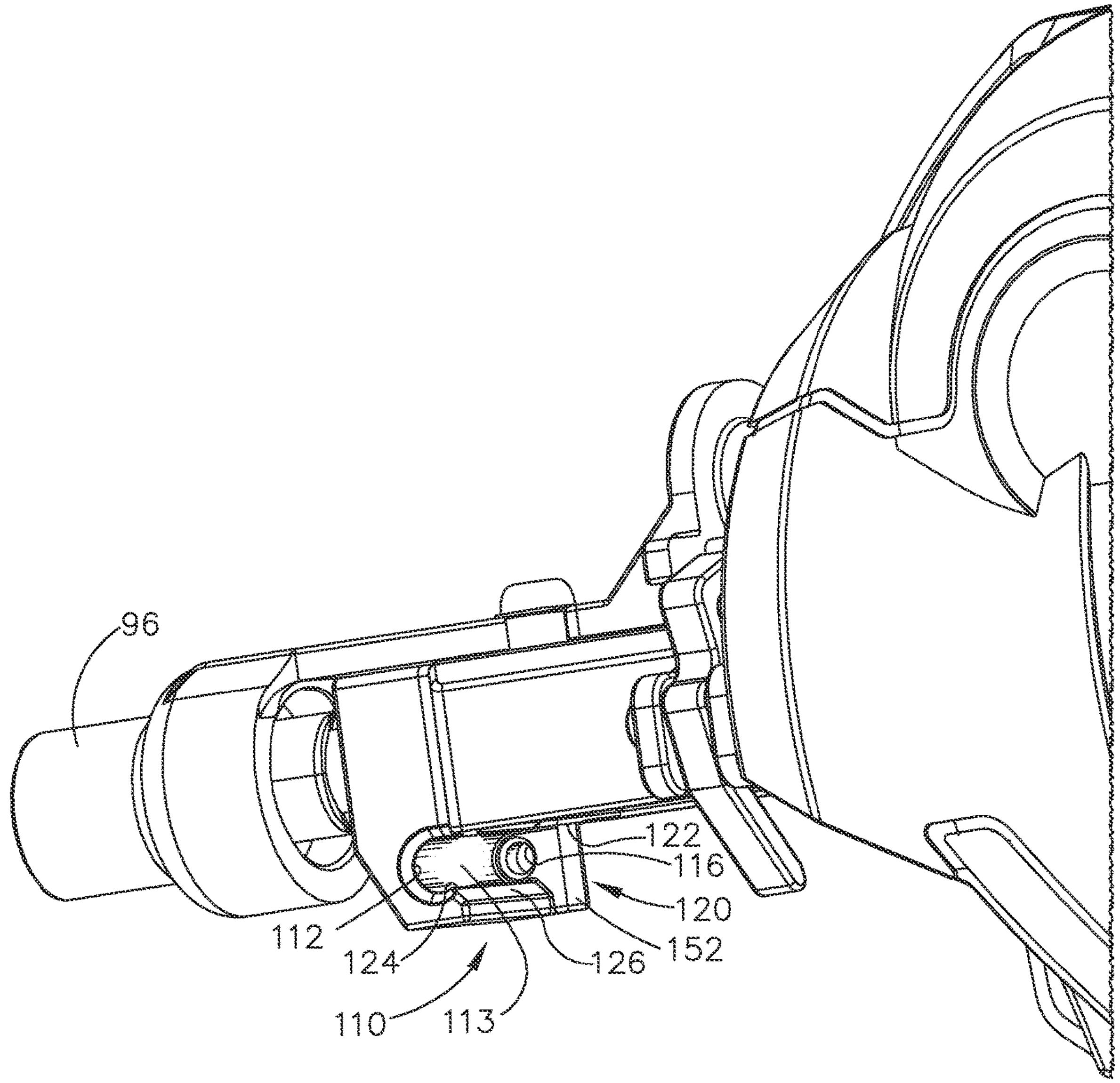
FIG. 28 is a left, rear perspective view showing the first magazine attachment pivot point of the tool of FIG. 22.

Referring now to FIG. 28, the nosepiece 92 and the rounded receptacle S/A 110 are shown in a left, rear perspective view. In FIG. 28, the opening in the backplate 116 is more easily shown. This opening in the backplate 116 is the engagement point for the side protrusion 136 of the fulcrum (see FIG. 29). The side protrusion 136 is inserted into the opening in the backplate 116 as part of the second step of attaching the magazine 8 to the tool 10. This is another detail that helps guide the human user into naturally attaching and pivoting the magazine 8 until it is secured via the magazine (holding) latch pin 164 and the tool bracket 172.

Also shown in FIG. 28 is the width of the (flat) bottom portion 122 of the guide body. The width of the (flat) bottom portion 122 also helps secure the magazine 8 to the tool when the magazine's upper (flat) surface 142 is pressed against the (flat) bottom portion of the guide body. FIG. 28 depicts a ramp surface 126 as part of the guide body. The ramp surface 126 is what the 'guides' the forward extension portion of the magazine, including its fulcrum 130, second corner 146, and lower flat surface 144, when the magazine 8 is pivoted into an engaged position. The ramp surface 126 is another detail that naturally guides the human user into easily attaching the magazine 8 to the tool 10.

Figure 29:
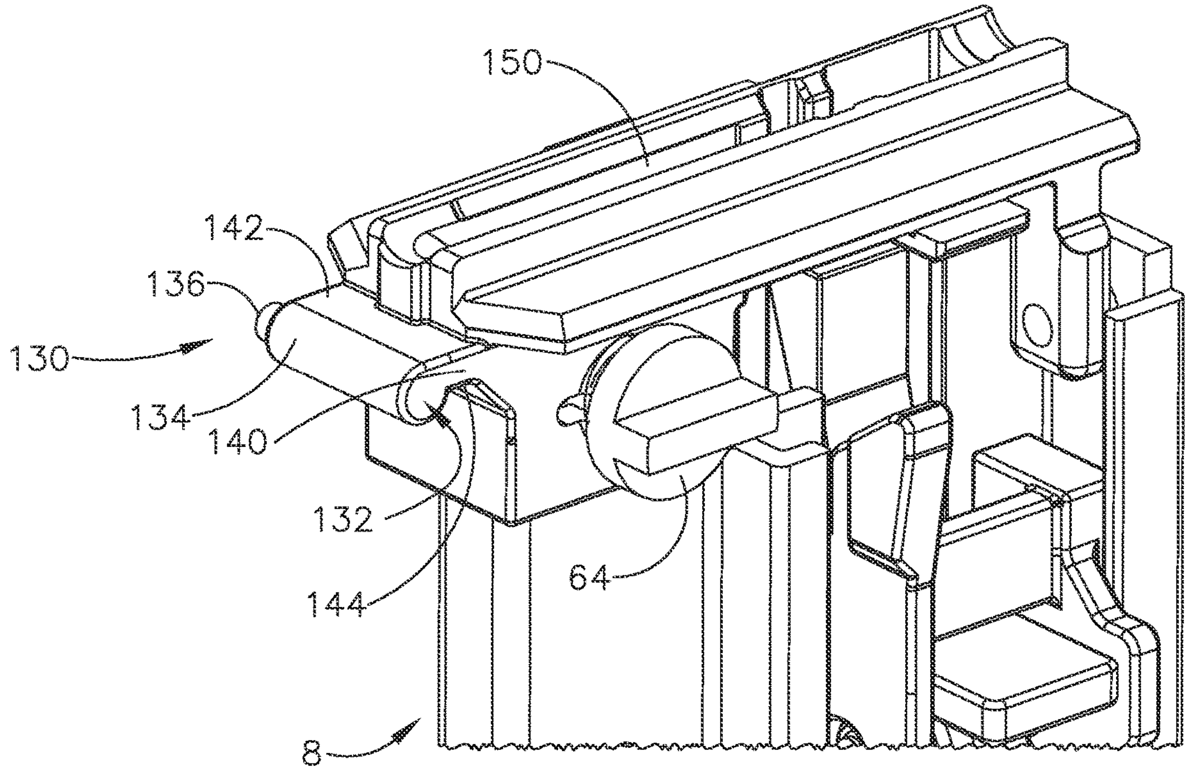
FIG. 29 is a left, front perspective view of the magazine of FIG. 22, showing the corresponding magazine attachment pivot portion.

Referring now to FIG. 29, the magazine 8 is shown in a left, front perspective. In FIG. 29, the side protrusion 136 is shown extending outwards and to the left (in this view) from the fulcrum 130. Note the width of the upper (flat) surface 142, which helps hold the magazine 8 in place when pressed against the (flat) bottom portion 122 of the guide body 36 of the tool 10.

Note that some of the embodiments illustrated herein do not have all of their components included on some of the figures herein, for purposes of clarity. To see examples of such outer housings and other components, especially for earlier designs, the reader is directed to other U.S. patents and applications owned by Kyocera Senco. Similarly, information about "how" the electronic controller operates to control the functions of the tool is found in other U.S. patents and applications owned by Kyocera Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, 8,602,282, 9,676,088, 10,478,954, 9,993,913, 10,549,412, 10,898,994, 10,821,585 and 8,763,874; also published U.S. patent application No. 2020/0156228, published U.S. patent application No. 2021/0016424, published U.S. patent application No. 2020/0070330, and published U.S. patent application No. 2020/0122308. These documents are incorporated by reference herein, in their entirety.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A fastener magazine for a fastener driving tool, comprising:

(a) a magazine housing including a first end and a second end, and a longitudinal axis that extends between said first and second ends, said magazine housing configured to hold a plurality of fasteners that are placed between said first and second ends and are movable therebetween;

(b) a mounting bracket on said magazine housing proximal to said first end;

(c) a fastener pusher that biases said plurality of fasteners toward said first end;

(d) a movable fastener guide secured to said mounting bracket;

(e) said movable fastener guide having an engaged position and a disengaged position and said movable fastener guide comprises: a knob, a stem, a spring, a knob mounting pin, and a gate;

wherein:

(f) if in said engaged position, said movable fastener guide sequentially directs one of said plurality of fasteners toward said first end of the magazine in a manner such that one of said plurality of fasteners is prevented from completely backtracking, by mechanically interfering with a movement of said one of said plurality of fasteners that becomes misaligned; and (g) if in said disengaged position, said movable fastener guide does not mechanically interfere with a movement of said one of said plurality of fasteners;

(h) the knob that is connected by the stem to the gate, in which said knob is rotatable along a pivot axis that extends along said stem between said knob and said gate, in which said knob and said gate rotate together between a first angular position and a second angular position, wherein said first angular position corresponds to said engaged position of said movable fastener guide, and wherein said second angular position corresponds to said disengaged position of said movable fastener guide;

(i) the spring that is mounted along said stem, between said knob and a magazine surface, such that:

(i) if said knob is rotated to said second angular position, said spring biases said knob away from the magazine surface so that the knob is forced by said spring to an extended, distal position that is spaced-apart from the magazine surface;

(ii) if said knob is actuated by being rotated to said first angular position and pressed toward said magazine surface, it thereby moves into a non-extended position that is proximal to the magazine surface; and (j) the knob mounting pin that runs through said stem and which keeps said knob from moving away from said non-extended position, so long as the knob is not rotated to said second angular position.

2. The fastener magazine of claim 1, wherein:

if said knob is actuated, said gate is pivotable between said first angular position and said second angular position;

said first angular position is the engaged position wherein said gate mechanically interferes with a misaligned fastener of said plurality of fasteners; and said second angular position is the disengaged position wherein said gate does not mechanically interfere with said plurality of fasteners, and instead is moved into a pocket that is formed in said magazine.

3. The fastener magazine of claim 2, wherein:

said gate is positioned in a first plane if the knob is moved to said first angular position, in which said gate is not aligned with said pocket; and said gate is positioned in a second plane if the knob is moved to said second angular position, in which said gate is aligned with said pocket.

4. The fastener magazine of claim 1, wherein:

said gate includes a ramp surface that acts as the mechanical interference with a misaligned fastener, if the knob and gate are in the first angular position.

5. A fastener driving tool, comprising:

(a) a cylinder that includes a piston, said cylinder including a variable displacement volume on a first side of said piston, and said cylinder including a variable venting volume on a second, opposite side of said piston;

(b) a storage chamber;

(c) an end cap that is attached to at least one of said cylinder and said storage chamber near an end portion of said fastener driving tool;

(d) a driver that is in mechanical communication with said piston;

(e) a guide body that guides movements of said driver;

(f) a magazine housing including a first end and a second end, said magazine housing configured to hold a plurality of fasteners;

(g) a mounting bracket on said magazine housing proximal to said first end;

(h) a movable fastener guide secured to said mounting bracket, said movable fastener guide comprises:

(i) a gate;

(ii) a knob including a stem, which is mounted on said mounting bracket; and (iii) a spring mounted on said stem between said knob and said mounting bracket, and said spring biases said knob from said mounting bracket;

(i) said movable fastener guide including an engaged position and a disengaged position;

wherein:

(j) in said engaged position, said movable fastener guide sequentially directs one of said plurality of fasteners in a manner such that said fastener is prevented from completely backtracking; and (k) in said disengaged position, said movable fastener guide does not sequentially direct said plurality of fasteners.

6. The fastener driving tool of claim 5, wherein:

said knob is mechanically attached to said gate by said stem, such that when said knob is rotated said gate pivots between said engaged position and said disengaged position;

if in said engaged position, said gate is moved out of a pocket and directly in line with a fastener path to said guide body;

if in said disengaged position, said gate is moved into said pocket and out of line with said fastener path to said guide body; and said spring biases said gate into a direction toward said pocket.

7. A guide for use in a fastener magazine for use with a fastener driving tool, said guide comprising:

(a) a knob that is sized and shaped for actuation by a human hand, said knob being mounted on a surface of the fastener magazine, proximal to an exit end of said fastener magazine;

(b) a gate that is also located proximal to said exit end of the fastener magazine;

(c) a stem that resides between said knob and said gate, and has sufficient structural rigidity so that said gate is forced to move rotationally if said knob is moved rotationally;

(d) a spring that creates a biasing force against said knob and against said surface of the fastener magazine; and (e) a knob holding pin that secures the knob at said surface of the fastener magazine;

wherein:

(f) said knob and gate are movable between a disengaged position and an engaged position, such that:

(i) if said knob and said gate are in said disengaged position, then the gate resides in a non-interfering location, and a fastener moving through said fastener magazine will not make physical contact with the guide; and (ii) if said knob and said gate are in said engaged position, then the knob holding pin keeps the knob in that engaged position until released by an action of a human hand, and the gate resides in an interfering location, in which a misaligned fastener will make physical contact with a ramp portion of the guide, as the fastener is being driven by a moving driver of the fastener driving tool that is adjacent to said exit end of the fastener magazine.

8. The movable guide of claim 7, wherein: said ramp portion of the gate is sized and shaped to re-direct a fastener that is in a process of being driven by the moving driver, if said fastener becomes misaligned while being fed from said exit end of the fastener magazine.

9. The guide of claim 7, wherein: said spring comprise a coil spring that is mounted along said stem, between said knob and the surface of the fastener magazine.

10. The guide of claim 9, wherein:

(a) if said knob is in the disengaged position, then said knob is biased away from the surface of the fastener magazine by the coil spring, and into a distal position that is spaced-apart from the surface of the fastener magazine; and (b) if said knob is in the engaged position, then said knob has been pushed toward the surface of the fastener magazine into a proximal position, and then rotated, and said knob holding pin acts as a detent to hold the knob in said engaged position.

11. The guide of claim 10, wherein:

(a) if said knob is in the disengaged position, then said gate is located in a first plane that includes said non-interfering location of the gate; and (b) if said knob is in the engaged position, then said gate is located in a second plane that includes said interfering location of the gate, in which said first and second planes are substantially parallel to one another.

12. The guide of claim 11, wherein, if said knob is in the disengaged position, then said gate resides in a pocket that is formed in said magazine, in which said first plane intersects said pocket.

13. A method for attaching a fastener magazine to a fastener driving tool, the method comprising:

(a) providing the fastener driving tool that includes at least a housing, a handle portion, a front end subassembly proximal to an exit end of the fastener driving tool; said front end subassembly comprising a rounded receptacle subassembly, and a guide body having a bottom portion and a backplate, said rounded receptacle subassembly including at least:

(i) an opening in the backplate of said guide body, said opening exhibiting a geometric center;

(ii) a ramp surface; and (iii) a first corner between said opening and said ramp surface;

(b) providing a removably attachable fastener magazine having a magazine housing including a first end and a second, end, and a longitudinal axis that extends between said first and second ends, said magazine housing configured to hold a plurality of fasteners that are placed between said first and second ends and are movable therebetween, said fastener magazine exhibiting a fulcrum portion that includes:

(i) a cylindrical outer surface;

(ii) a side protrusion proximal to said cylindrical outer surface of the fulcrum portion; and (iii) an extension portion that extends between said cylindrical outer surface and said first end of the fastener magazine, said extension portion having an upper surface portion and a lower surface portion; and (c) attaching said fastener magazine to said fastener driving tool by:

(i) inserting said side protrusion into said opening of the backplate;

(ii) rotating said fulcrum portion around said geometric center of the opening in the backplate;

(iii) pressing said upper surface portion of the fastener magazine against said bottom portion of the guide body; and (iv) engaging a mounting bracket on said fastener driving tool with a latch subassembly on said fastener magazine.

14. The method of claim 13, wherein:

said fulcrum portion of the fastener magazine is rotatable about said geometric center if said side protrusion is engaged with said opening; and said mounting bracket on said fastener driving tool is engageable with said latch subassembly on said fastener magazine if the fastener magazine is rotated in a direction towards said fastener driving tool.

15. The method of claim 14, wherein:

said fastener magazine is rotatable in a planar direction towards said fastener driving tool if said side protrusion is engaged with said opening.

16. A fastener driving tool having a removable fastener magazine, said fastener driving tool comprising:

(a) a housing, a handle portion, and a nose portion that includes a guide body having a fastener track and a first mounting bracket receiving portion, said nose portion exhibiting a rounded receptacle subassembly that includes:

(i) a bottom portion;

(ii) a rounded opening in said bottom portion;

(iii) a ramp surface proximal to said rounded opening; and (iv) a geometric center proximal to said rounded opening; and (b) the removable fastener magazine having a first end, a second end, and a longitudinal axis that extends between said first and second ends, said removable fastener magazine configured to hold a plurality of fasteners placed between said first and second ends and are movable therebetween, said removable fastener magazine including a first mounting bracket with a fulcrum portion that exhibits:

(i) a fulcrum having a cylindrical outer surface; and (ii) an extension portion having an upper surface portion and a lower surface portion, said extension portion extending to said fulcrum;

wherein, said removable fastener magazine pivotally attaches to said fastener driving tool at said geometric center of the rounded opening of the rounded receptacle subassembly.

17. The fastener driving tool of claim 16, further comprising:

(a) a second mounting bracket on a motor housing of the fastener driving tool; and (b) a magazine latch pin that is mounted along an elongated side portion of said removable fastener magazine.

18. The fastener driving tool of claim 17, wherein:

said removable fastener magazine is secured to said fastener driving tool when:

(a) said fulcrum is seated into said rounded opening of the rounded receptacle subassembly;

(b) said fulcrum portion is rotated about said geometric center in a direction towards said housing;

(c) said first mounting bracket is seated into said first mounting bracket receiving portion of the nose portion; and (d) said second mounting bracket is seated with said magazine latch pin.

19. The fastener driving tool of claim 16, wherein:

(a) said guide body includes a backplate that exhibits an opening;

(b) said geometric center of the rounded opening is concentric with said opening of the backplate of the guide body;

(c) said fulcrum portion includes a side protrusion that is co-linear with said fulcrum; and (d) said side protrusion is sized and shaped to fit into said opening of the backplate of the guide body.

20. The fastener driving tool of claim 19, wherein said ramp surface assists in guiding said fulcrum of the removable fastener magazine into said rounded opening of the rounded receptacle subassembly.

21. The fastener driving tool of claim 20, further comprising: a first corner between said rounded opening and said ramp surface;

wherein: said first corner assists in holding said fulcrum of the removable fastener magazine in place in said rounded opening of the bottom portion of the rounded receptacle subassembly.

22. The fastener driving tool of claim 21, further comprising: a second corner between said lower surface portion and said cylindrical outer surface of the fulcrum portion of the magazine;

wherein: said second corner assists in seating said fulcrum portion of the magazine into said rounded opening of the bottom portion of the rounded receptacle subassembly.

23. The fastener driving tool of claim 19, further comprising:

(a) a second mounting bracket on a motor housing of the tool; and (b) a magazine latch pin that is mounted along an elongated side portion of said removable fastener magazine.

24. The fastener driving tool of claim 23, wherein:

said removable fastener magazine is secured to said fastener driving tool when:

(a) said side protrusion of the fulcrum portion is seated into said opening of the backplate of the guide body;
(b) said fulcrum portion is rotated about said geometric center in a direction towards said fastener driving tool housing;
(c) said first mounting bracket is seated into said first mounting bracket receiving portion of the nose portion; and
(d) said second mounting bracket is seated with said magazine latch pin.

* * * * *